United States Patent
Yu et al.

(10) Patent No.: US 12,462,421 B2
(45) Date of Patent: *Nov. 4, 2025

(54) APPARATUS INCLUDING NPU OPERATED BASED ON MACHINE CODES CORRESPONDING TO ANN MODEL

(71) Applicant: DEEPX CO., LTD., Seongnam-si (KR)

(72) Inventors: Ha Joon Yu, Seongnam-si (KR); You Jun Kim, Suwon-si (KR); Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,143

(22) Filed: Mar. 12, 2024

(65) Prior Publication Data

US 2024/0221204 A1  Jul. 4, 2024

Related U.S. Application Data

(63) Continuation of application No. 18/317,642, filed on May 15, 2023, now Pat. No. 11,948,326.

(30) Foreign Application Priority Data

Dec. 19, 2022 (KR) .......................... 10-2022-0178092

(51) Int. Cl.
  *G06T 7/00* (2017.01)
  *G06T 3/40* (2006.01)
  *G06T 7/11* (2017.01)
  *G06T 7/20* (2017.01)
  *G06T 7/70* (2017.01)
  *G06V 10/764* (2022.01)
  *G06V 10/771* (2022.01)
  *H04N 23/61* (2023.01)
  (Continued)

(52) U.S. Cl.
  CPC .................. *G06T 7/70* (2017.01); *G06T 3/40* (2013.01); *G06T 7/11* (2017.01); *G06T 7/20* (2013.01);
  (Continued)

(58) Field of Classification Search
  CPC .................. B64U 2101/30; G06T 7/73; G06T 2207/10032; G06T 2207/20081;
  (Continued)

(56) References Cited

U.S. PATENT DOCUMENTS

2007/0070201 A1  3/2007  Yokomitsu et al.
2010/0265331 A1  10/2010  Tanaka
(Continued)

OTHER PUBLICATIONS

Qiu, Jiantao, et al. "Going deeper with embedded FPGA platform for convolutional neural network." Proceedings of the 2016 ACM/SIGDA international symposium on field-programmable gate arrays. 2016.*

(Continued)

*Primary Examiner* — Li Liu
(74) *Attorney, Agent, or Firm* — Bridgeway IP Law Group, PLLC; Jihun Kim

(57) ABSTRACT

An electronic device mounted on a fixed or a movable apparatus is provided. The electronic device may comprise an image signal processor (ISP) for at least one camera; a neural processing unit (NPU), including a plurality of processing elements (PEs), configured to: process an operation of an artificial neural network model trained to detect or track at least one object, based on an input feature map generated from at least one image, which is acquired via the ISP from the at least one camera, and output an inference result; and a signal generator generating a signal applicable to the at least one camera or the ISP.

20 Claims, 28 Drawing Sheets

(51) Int. Cl.
  *H04N 23/67* (2023.01)
  *H04N 23/69* (2023.01)
  *H04N 23/695* (2023.01)
(52) U.S. Cl.
  CPC .......... *G06V 10/764* (2022.01); *G06V 10/771* (2022.01); *H04N 23/61* (2023.01); *H04N 23/67* (2023.01); *H04N 23/69* (2023.01); *H04N 23/695* (2023.01); *G06T 2207/20084* (2013.01); *G06V 2201/07* (2022.01)
(58) Field of Classification Search
  CPC . G06T 2207/20084; G06T 7/246; G06T 7/70; G06T 2207/10016; G06T 2207/10048; G06V 10/82; G06V 20/10; G06V 40/172; H04N 23/69
  See application file for complete search history.

(56) References Cited

U.S. PATENT DOCUMENTS

| | | |
|---|---|---|
| 2012/0075467 A1 | 3/2012 | Lee et al. |
| 2015/0116576 A1 | 4/2015 | Grandin et al. |
| 2018/0046913 A1* | 2/2018 | Yu .......................... G06F 13/102 |
| 2019/0082101 A1 | 3/2019 | Baldwin et al. |
| 2019/0244498 A1 | 8/2019 | Dumas |
| 2019/0258883 A1 | 8/2019 | Britto Mattos Lima et al. |
| 2020/0020093 A1 | 1/2020 | Frei et al. |
| 2020/0092463 A1 | 3/2020 | Wang et al. |
| 2020/0143545 A1 | 5/2020 | Weng et al. |
| 2020/0346753 A1 | 11/2020 | Qian et al. |
| 2021/0136292 A1 | 5/2021 | Hoch et al. |
| 2021/0166367 A1 | 6/2021 | Han et al. |
| 2022/0309767 A1 | 9/2022 | Keefe et al. |
| 2022/0318606 A1 | 10/2022 | Kim |
| 2023/0063939 A1 | 3/2023 | Xie et al. |

OTHER PUBLICATIONS

Chen, Long, et al. "Onboard real-time object detection for UAV with embedded NPU." 2021 IEEE 11th Annual International Conference on Cyber Technology in Automation, Control, and Intelligent Systems (Cyber). IEEE, 2021.*

Li, Xianjiang, et al. "Wide-area and real-time object search system of UAV." Remote Sensing 14.5 (2022): 1234.*

* cited by examiner

APPARATUS INCLUDING NPU OPERATED BASED ON MACHINE CODES CORRESPONDING TO ANN MODEL

CROSS-REFERENCE TO RELATED APPLICATIONS

This application is a continuation application of the U.S. Utility patent application Ser. No. 18/317,642 filed on May 15, 2023, which claims the priority of Korean Patent Application No. 10-2022-0178092 filed on Dec. 19, 2022, in the Korean Intellectual Property Office, the disclosure of which is incorporated herein by reference.

BACKGROUND OF THE DISCLOSURE

Technical Field

The present disclosure relates to an electronic device mounted on a fixed device or a movable apparatus and equipped with NPU and ISP.

Background Art

Recently, research on electronic devices equipped with artificial intelligence semiconductors is being conducted.

Examples of the movable apparatus include an autonomous vehicle, a robot, or a drone. For example, drones collectively are referred to unmanned aerial vehicles (UAVs) or uninhabited aerial vehicles (UAVs) in the form of airplanes or helicopters capable of flying and controlling autonomous flight without a pilot or induction of radio waves.

Drones are being used in increasingly expanding fields such as military and industrial use.

SUMMARY OF THE DISCLOSURE

A movable apparatus should make a quick decision in proportion to the moving speed of the device. Therefore, a movable apparatus requires an artificial intelligence system having a processing speed corresponding to the high speed of the device.

Movable apparatus should be able to recognize objects at great distances. Therefore, mobile devices require artificial intelligence systems that can effectively recognize distant objects.

Movable apparatus should be able to fly for long periods of time. Therefore, movable apparatus requires artificial intelligence systems that can operate with low power.

Accordingly, an example of the present disclosure aims to present a fixed or movable apparatus equipped with an artificial intelligence system in order to solve the above problems.

According to examples of the present disclosure, an electronic device mounted on a fixed or a movable apparatus is provided. The electronic device may comprise a neural processing unit (NPU), including a plurality of processing elements (PEs), configured to process an operation of an artificial neural network model trained to detect or track at least one object and output an inference result based on at least one image acquired from at least one camera; and a signal generator generating a signal applicable to the at least one camera.

An example of the movable apparatus may be a drone. Hereinafter, a drone will be described as an example, but this is only an example and the examples presented in the present disclosure are not limited to drones. The movable apparatus may be a car, ship, airplane, robot, or the like.

According to an example of the present disclosure, an electronic device mounted on a movable apparatus is provided. The electronic device may comprise a neural processing unit (NPU), including a plurality of processing elements (PEs), configured to process an operation of an artificial neural network model trained to detect or track at least one object and output an inference result based on at least one image acquired from at least one camera; and a signal generator generating a signal applicable to the at least one camera. The generated signal may include at least one command for mechanically or electrically controlling the at least one camera to increase the accuracy of the detecting or tracking.

At least one camera may include a lens, an image sensor, and a motor for moving the lens to increase or decrease a distance between the lens and the image sensor.

The at least one command may be implemented to move or rotate at least one of a body, a lens, or an image sensor of the at least one camera in X, Y, or Z axis direction; or increases or decreases a focal distance of the at least one camera.

The at least one command may be implemented to increase or decrease a viewing angle of the at least one camera, move or rotate a field of view (FoV) of the at least one camera in X, Y, or Z direction, increase or decrease a frame per second (FPS) of the at least one camera, or zoom-in or zoom-out the at least one camera.

The at least one camera may include a lens, an image sensor, and a motor for increasing or decreasing a distance between the lens and the image sensor by moving the lens.

The at least one camera may include a first camera and a second camera having a smaller viewing angle than a viewing angle of the first camera or the at least one camera may include a wide-angle camera and a telephoto camera.

When the at least one object is detected or tracked with a confidence level less than a first threshold, the signal may be generated to include a coordinate of the at least one object.

The signal including the coordinate of the at least one object may be used to enable the at least one camera to capture a portion of the image including the at least one object at a larger size such that the at least one object is zoomed-in by using the coordinate.

When the at least one camera include a first camera and a second camera having a smaller viewing angle than a viewing angle of the first camera, a field of view (FoV) of the second camera may be moved or rotated in the X, Y, or Z axis direction based on the coordinate.

When the at least one camera include a first camera and a second camera having a smaller viewing angle than a viewing angle of the first camera, the first camera may be used to enable the NPU to detect the at least one object, and the second camera may be used to enable the NPU to track the detected at least one object.

The signal may be generated based on a flight altitude or height of the movable apparatus.

The at least one camera may include a visible light camera, an ultra violet camera, an infrared camera, a thermal imaging camera, or a night vision camera.

According to an example of the first disclosure, a method for detecting or tracking an object using a movable apparatus is provided. The method may comprise steps of: detecting or tracking at least one object based on one or more images obtained from one or more cameras; generating a signal including at least one command for mechanically or electrically controlling the one or more cameras in order to increase accuracy of the detecting or tracking; mechanically or electrically controlling the one or more cameras based on the generated signal; and continuing the detecting or tracking at least one object based on a subsequent image obtained from the one or more cameras mechanically or electrically controlled based on the generated signal.

According to an example of the second disclosure, an electronic device mounted on a movable apparatus is provided. The movable apparatus may include an image signal processor (ISP) that generates an adjustable input feature map having an adjustable dimension by processing an image captured from a camera based on determination data; a neural processing unit (NPU) that includes a plurality of processing elements (PEs) and processes the operation of an artificial neural network model by inputting the adjustable input feature map to the plurality of PEs; and a controller that generates the determination data based on at least one environmental condition data.

According to another example of the present disclosure, an electronic device mounted on a movable apparatus is provided. The electronic device may comprise: an image signal processor (ISP) for at least one camera; a neural processing unit (NPU), including a plurality of processing elements (PEs), configured to: process an operation of an artificial neural network model trained to detect or track at least one object, based on an input feature map generated from at least one image, which is acquired via the ISP from the at least one camera, and output an inference result; and a signal generator generating a signal applicable to the at least one camera or the ISP.

The ISP may generate the input feature map which has an adjustable dimension by processing the at least one image based on a determination data.

The electronic device may further comprise: a controller that generates the determination data based on at least one environmental condition data. The NPU may process the operation of an artificial neural network model by inputting the input feature map to the plurality of PEs.

The resolution or the size of the input feature map may be adjusted based on the determination data.

The dimension of the input feature map may be adjusted based on the determination data.

The dimensions of the input feature map may include the horizontal size and vertical size of the feature map and the number of channels.

The environmental condition data may include a flight altitude of the movable apparatus, a height from sea level or ground of the fixed device or the movable apparatus, or a flight speed of the movable apparatus.

According to another example of the second disclosure, an electronic device mounted on a movable apparatus is provided. The electronic device mounted on a movable apparatus may include a neural processing unit (NPU) that processes the operation of an artificial neural network model based on one or more input feature maps generated based on images obtained from a camera; and a signal generator for generating a signal for one or more input feature maps. The generated signal may include at least one command for controlling generation of the one or more input feature maps or controlling at least one attribute of the one or more input feature maps.

The one or more input feature maps may be transmitted to an arbitrary layer among a plurality of layers of the artificial neural network model.

The at least one attribute may include a size of the at least one input feature map or a resolution of the at least one input feature map.

The size or resolution may be dynamically adjusted based on a flight altitude of the movable apparatus, a height from sea level or ground of the movable apparatus, or a flight speed of the movable apparatus.

The generated signal may be generated based on a flight altitude of the movable apparatus, a height from sea level or ground of the movable apparatus, or a flight speed of the movable apparatus.

The movable apparatus may further include circuitry for changing the at least one attribute of the at least one input feature map. The at least one attribute may include size or resolution.

The at least one command may cause more of the one or more input feature maps to be generated per second.

The at least one attribute may be the size of the at least one input feature map and when the size of the at least one input feature map is reduced based on the generated signal, more of the at least one input feature map may be generated per second.

When the flight altitude of the movable apparatus, the height from the sea level or the ground of the movable apparatus, or the flight speed of the movable apparatus increases, a resolution corresponding to the at least one attribute may be increased based on the generated signal.

The camera may include a first camera and a second camera having a smaller viewing angle than a viewing angle of the first camera or the camera may include a wide-angle camera and a telephoto camera.

The camera may include a visible light camera, an ultra violet camera, an infrared camera, a thermal imaging camera, or a night vision camera.

When a flight altitude of the movable apparatus, a height from sea level or ground of the fixed device or the movable apparatus, or a flight speed of the movable apparatus increases, the NPU may detect an object in an image acquired from an infrared camera or a thermal imaging camera. Here, the generated signal may be used to increase a resolution corresponding to the at least one attribute.

According to another example of the second disclosure, a method for detecting or tracking an object using a movable apparatus is provided. The method may comprise steps of: generating a determination data based on an environmental condition data; generating an adjustable input feature map based on the determination data; and detecting or tracking the object by processing an artificial neural network model operation based on the generated input feature map.

According to an example of the third disclosure, a movable apparatus is provided.

The electronic device mounted on the movable apparatus may include a processor for partitioning at least one image acquired from the at least one camera into a plurality of image blocks based on a determination data; and a NPU processes the operation of the artificial neural network model based on the plurality of blocks. The determination data may be set to determine a number of the plurality of image blocks.

The determination data may be determined according to a flight altitude of the movable apparatus, a height from sea level or the ground of the movable apparatus, or a flight speed of the movable apparatus.

When the flight altitude of the movable apparatus or the height of the movable apparatus from sea level or the ground increases, the number of the plurality of image blocks may increase.

When the number of the plurality of image blocks is greater than the first threshold, the size of the plurality of image blocks may be upscaled before being input to the NPU.

The camera may include a first camera and a second camera having a smaller angle of view than the angle of view of the first camera. Alternatively, the camera may include: a wide-angle camera and a telephoto camera.

The camera may include: a visible light camera, an ultra violet camera, an infrared camera, a thermal imaging camera, or a night vision camera.

According to an example of the third disclosure, an electronic device mounted on a movable apparatus is provided. The electronic device mounted on a movable apparatus may include an image preprocessor dividing the at least one image acquired from the at least one camera into a plurality of blocks, and a NPU processing the operation of the artificial neural network model based on at least one input feature map generated based on each of the plurality of image blocks. A number of the plurality of image blocks may be dynamically determined based on a motion of the movable apparatus.

The plurality of image blocks may be used as inputs to process the computation of the artificial neural network model.

When the number of the plurality of image blocks is greater than the first threshold, the size of the plurality of image blocks may be upscaled before being input to the NPU.

The number of the plurality of image blocks may be increased when a flight altitude of the movable apparatus or a height from sea level or ground of the movable apparatus increases or a flight speed of the movable apparatus increases.

The one or more input feature maps may be transferred to any layer among the plurality of layers of the artificial neural network model.

The camera may include a first camera and a second camera having a smaller angle of view than the angle of view of the first camera. Alternatively, the camera may include: a wide-angle camera and a telephoto camera.

The camera may include: a visible light camera, an ultra violet camera, an infrared camera, a thermal imaging camera, or a night vision camera.

When a flight altitude of the movable apparatus, a height from sea level or the ground of the fixed device or the movable apparatus rises, an object in an image acquired from a thermal imaging camera may be detected by an artificial neural network model performed by the NPU, and an object in an image acquired from a visible ray camera may be classified by the artificial neural network model performed by the NPU.

According to the present disclosure, a target may be detected or tracked using a camera of a fixed or movable apparatus. More specifically, when the photographing altitude of a fixed or movable apparatus is increased, since the target is photographed in a considerably small size, there is a disadvantage in that detection or tracking accuracy may be lowered. However, according to examples of the present disclosure, even when the flight altitude of a movable apparatus rises, it is possible to improve the accuracy of detection or tracking.

Specifically, according to examples of the present disclosure, when the flight altitude of a movable apparatus increases, the accuracy of detection or tracking may be improved by automatically capturing an image at a higher resolution. In this case, by lowering the frame rate per second (FPS), battery consumption can be reduced. On the other hand, when the flight altitude of the movable apparatus decreases, the accuracy of detection or tracking may be increased by automatically taking images at a lower resolution and increasing the frame rate per second (FPS) instead.

DETAILED DESCRIPTION OF THE EMBODIMENT

Figure 1:
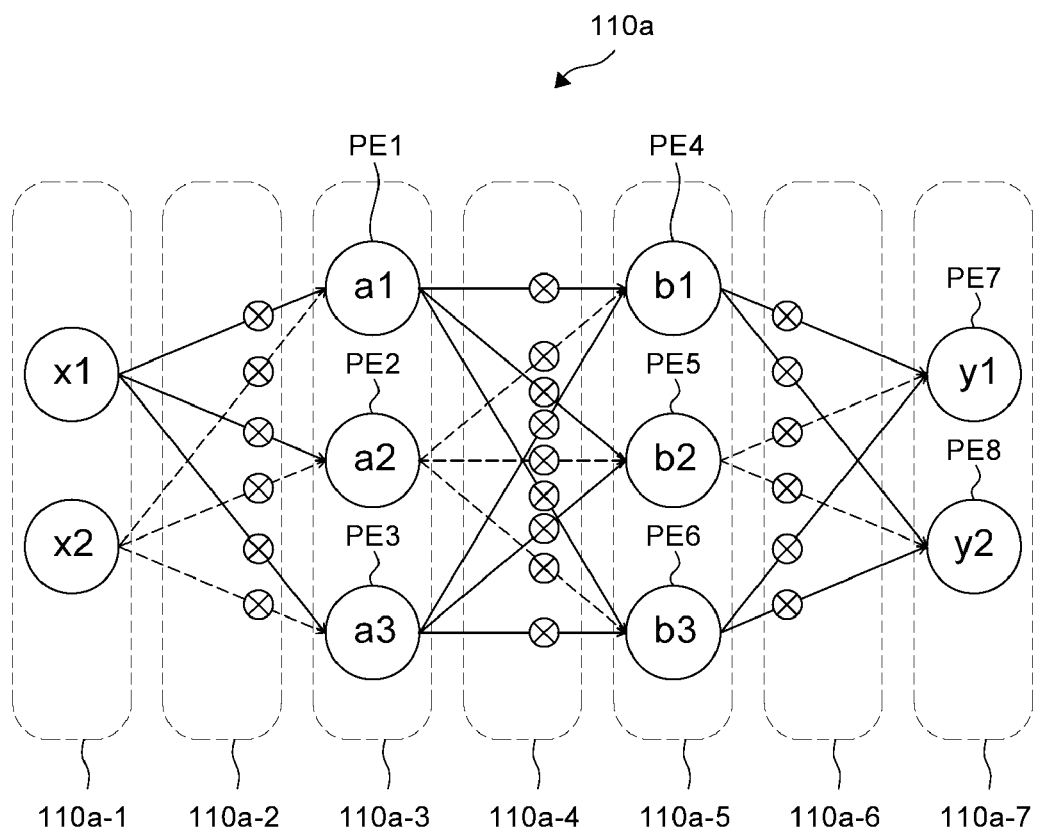
FIG. 1 is a diagram illustrating an exemplary artificial neural network model.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are included in the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present specification are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

When the examples are described, a technology which is well known in the technical field of the present disclosure and is not directly related to the present disclosure will not be described. The reason is that unnecessary description is omitted to clearly transmit the gist of the present disclosure without obscuring the gist.

In describing examples, descriptions of technical contents that are well known in the art to which the present disclosure pertains and are not directly related to the present disclosure will be omitted. This is to more clearly convey the gist of the present disclosure without obscuring it by omitting unnecessary description.

Definitions of Terms

Here, in order to help the understanding of the disclosure proposed in the present specification, terminologies used in the present specification will be defined in brief.

NPU is an abbreviation for a neural processing unit and refers to a processor specialized for an operation of an artificial neural network model separately from the central processor (CPU).

ANN is an abbreviation for an artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by explaining examples of the present disclosure with reference to the accompanying drawings.

<Artificial Intelligence>

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels.

Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs. FIG. 1 illustrates a schematic artificial neural network model.

Hereinafter, an operation of a schematic artificial neural network model 110a110a which may operate in the NPU 100 will be explained.

The schematic artificial neural network model 110a110a of FIG. 1 may be an artificial neural network trained to perform various inference functions such as object recognition or voice recognition.

The artificial neural network model 110a may be a deep neural network (DNN).

However, the artificial neural network model 110a110a according to the examples of the present disclosure is not limited to the deep neural network.

For example, the artificial neural network model can be a model such as Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110a110a may be an ensemble model based on at least two different models.

Hereinafter, an inference process by the exemplary artificial neural network model 110a will be described.

The artificial neural network model 110a may be an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited only to the artificial neural network model illustrated in FIG. 1. The first hidden layer 110a-3 and the second hidden layer 110a-5 may also be referred to as a plurality of hidden layers.

The input layer 110a-1 may exemplarily include input nodes X1 and X2. That is, the input layer 110a-1 may include information about two input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3. Here, the nodes and weights may be referred to as parameters.

For example, the first hidden layer 110a-3 may include nodes a1, a2, and a3. That is, the first hidden layer 110a-3 may include information about three node values.

Figure 3:
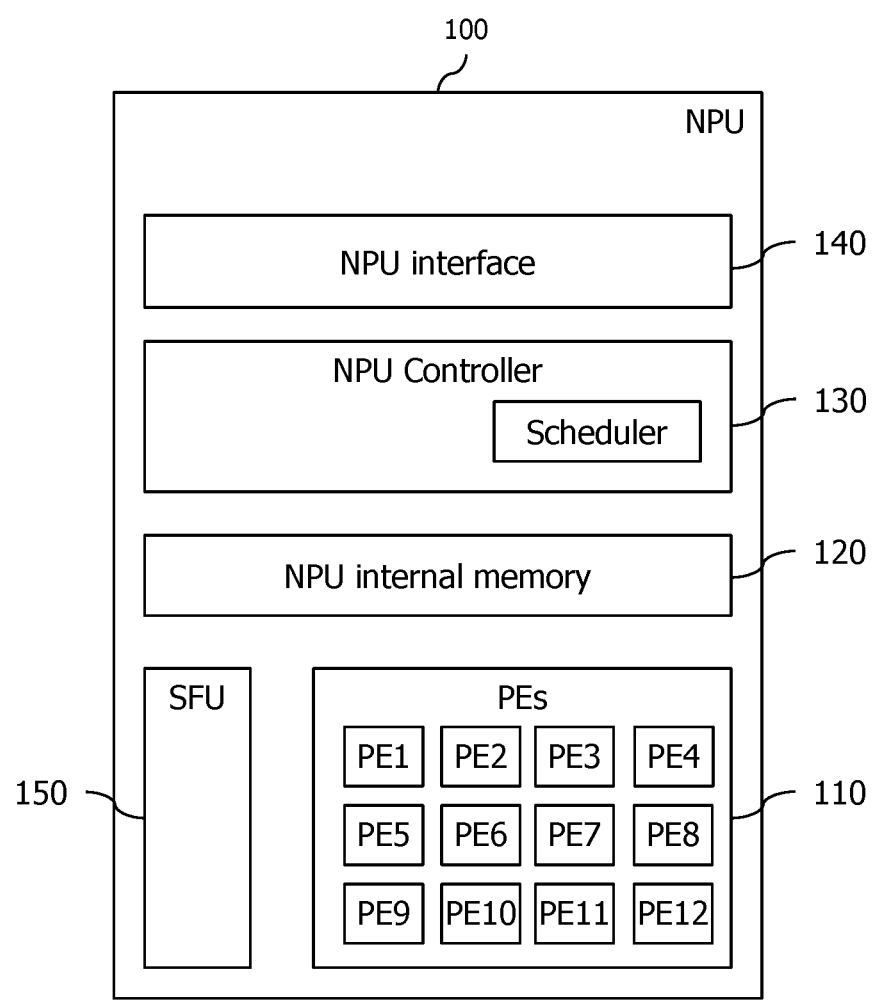
FIG. 3 is a diagram illustrating a neural processing unit according to the present disclosure.

The first processing element PE1 of FIG. 3 may perform the MAC operation of the a1 node.

The second processing element PE2 of FIG. 3 may perform the MAC operation of the a2 node.

The third processing element PE3 of FIG. 3 may perform the MAC operation of the a3 node.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values.

The fourth processing element PE4 of FIG. 3 may process the operation of the b1 node.

The fifth processing element PE5 of FIG. 3 may process the operation of node b2.

The sixth processing element PE6 of FIG. 3 may process the operation of node b3.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values.

The seventh processing element PE7 of FIG. 3 may process the operation of node y1.

The eighth processing element PE8 of FIG. 3 may process the operation of node y2.

Figure 2A:
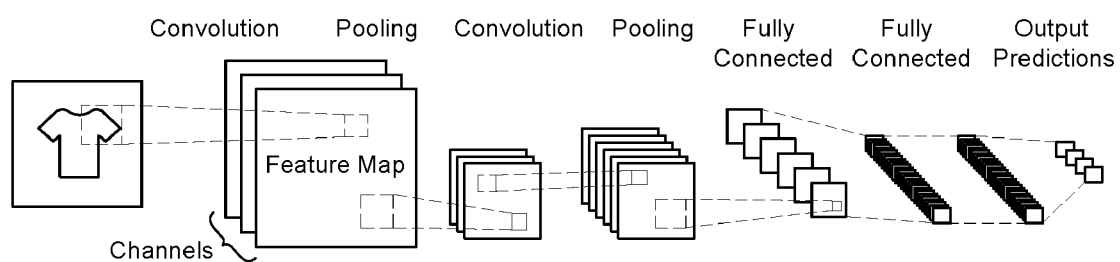
FIG. 2A is a diagram illustrating the basic structure of a convolutional neural network (CNN).

FIG. 2A is a diagram illustrating the basic structure of a convolutional neural network (CNN).

Referring to FIG. 2A, an input image may be displayed as a two-dimensional matrix composed of rows of a specific size and columns of the specific size. An input image may have a plurality of channels, where the channels may represent the number of color components of the input data image.

The convolution process performs a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 2B:
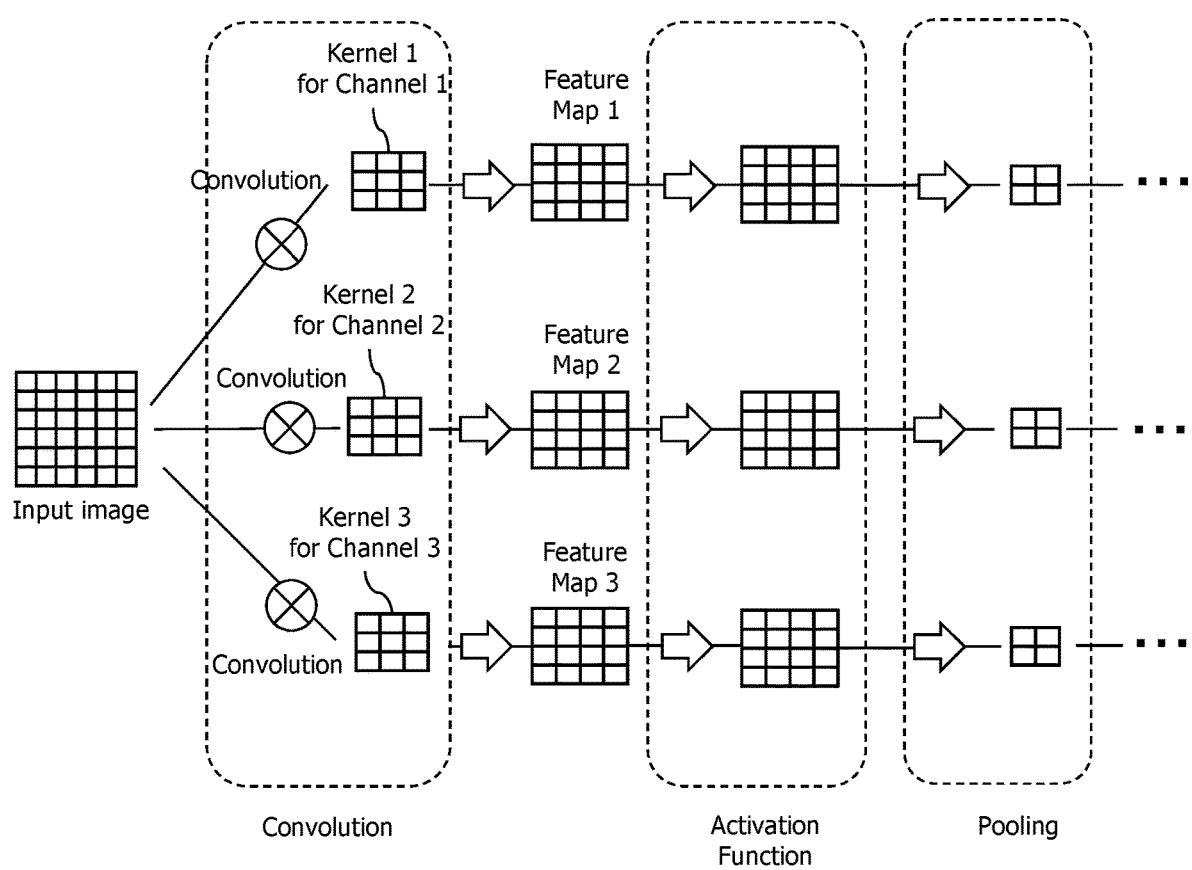
FIG. 2B is a comprehensive diagram illustrating the operation of a convolutional neural network.

FIG. 2B is a comprehensive diagram showing the operation of a convolutional neural network.

Referring to FIG. 2B, an input image is schematically represented as a two-dimensional matrix in a 6×6 size. In addition, FIG. 2B schematically illustrates three nodes, channel 1, channel 2, and channel 3.

First, the convolution operation will be described.

The input image (shown as an example of size 6×6 in FIG. 2B) is convolved with a kernel 1 (shown as an example of size 3×3 in FIG. 2B) for channel 1 at the first node, resulting in the output feature map 1 (shown as an example of size 4×4 in FIG. 2B). Similarly, the input image (shown as an example of size 6×6 in FIG. 2B) is convolved with a kernel 2 (shown as an example of size 3×3 in FIG. 2B) for channel 2 at the second node, resulting in the output feature map 2 (shown as an example of size 4×4 in FIG. 2B). Additionally, the input image is convolved with a kernel 3 (shown as an example of size 3×3 in FIG. 2B) for channel 3 at the third node, resulting in the output feature map 3 (shown as an example of size 4×4 in FIG. 2B).

To process each convolution, the processing elements PE1 to PE12 of the NPU 100 (see FIG. 3) are configured to perform a MAC operation.

Next, the operation of the activation function will be described.

The feature map 1, the feature map 2, and the feature map 3 (which are represented as 4×4 examples as shown in FIG. 2B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 2B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 2B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The convolution, activation function, and pooling are repeated, and finally, it can be output as fully connected as shown in FIG. 2A. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

<Required Hardware Resources for CNN>

FIG. 3 is a schematic conceptual diagram illustrating a neural processing unit according to the present disclosure.

Referring to FIG. 3, a neural processing unit (NPU) 100 is a processor specialized to perform an operation for an artificial neural network.

The artificial neural network refers to a network of artificial neurons in which, various inputs or entry stimulations multiply by a weight, add the multiplied values together to produce a summary value, and convert the summary value by additionally adding a deviation using an active function, and lastly transmit the final value. The artificial neural network trained as described above may be used to output an inference result from input data.

The NPU 100 may be a semiconductor device implemented by an electric/electronic circuit. The electric/electronic circuit may refer to a circuit including a large number of electronic elements (transistors, capacitors, and the like).

In the case of a transformer and/or CNN-based artificial neural network model, the NPU 100 may select and process matrix multiplication operations, convolution operations, and the like according to the architecture of the artificial neural network.

For example, in each layer of a convolutional neural network (CNN), an input feature map corresponding to input data and a kernel corresponding to weights may be a matrix composed of a plurality of channels. A convolution operation between the input feature map and the kernel is performed, and a convolution operation and a pooled output feature map are generated in each channel. An activation map of a corresponding channel is generated by applying an activation function to the output feature map. After that, pooling for the activation map may be applied. Here, the activation map may be collectively referred to as an output feature map.

However, examples of the present disclosure are not limited thereto, and the output feature map means that a matrix multiplication operation or a convolution operation is applied.

To elaborate, the output feature map according to the examples of the present disclosure should be interpreted in a comprehensive sense. For example, the output feature map may be a result of a matrix multiplication operation or a convolution operation. Accordingly, the plurality of processing elements 110 may be modified to further include processing circuitry for additional algorithms.

The NPU 100 may be configured to include a plurality of processing elements 110 for processing convolution and matrix multiplication necessary for the above-described artificial neural network operation.

The NPU 100 may be configured to include each processing circuit optimized for matrix-multiplication operation, convolution operation, activation function operation, pooling operation, stride operation, batch-normalization operation, skip-connection operation, concatenation operation, quantization operation, clipping operation, padding operation, and the like required for the above-described artificial neural network operation.

For example, the NPU 100 may be configured to include the SFU 150 for processing at least one of activation function operation, pooling operation, stride operation, batch-normalization operation, skip-connection operation, concatenation operation, quantization operation, clipping operation, and padding operation for the above-described algorithms.

The NPU 100 may include a plurality of processing elements (PE) 110, an NPU internal memory 120, an NPU controller 130, and an NPU interface 140. Each of the plurality of processing elements 110, the NPU internal memory 120, the NPU controller 130, and the NPU interface 140 may be a semiconductor circuit to which a large number of the electronic elements are connected. Therefore, some of electronic elements may be difficult to identify or be distinguished with the naked eye, but may be identified only by an identifying operation.

For example, an arbitrary circuit may operate as a plurality of the processing elements 110, or may operate as an NPU controller 130. The NPU controller 130 may be configured to perform the function of the control unit configured to control the artificial neural network inference operation of the NPU 100.

The NPU 100 may include the plurality of processing elements 110, the NPU internal memory 120 configured to store an artificial neural network model inferred from the plurality of processing elements 110, and the NPU controller 130 configured to control the operation schedule with respect to the plurality of processing elements 110 and the NPU internal memory 120.

The NPU 100 may be configured to process the feature map corresponding to the encoding and decoding method using SVC (scalable video coding) or SFC (Scalable Feature Coding).

The plurality of processing elements 110 may perform an operation for an artificial neural network.

SFU 150 may perform another portion of the operation for the artificial neural network.

The NPU 100 may be configured to hardware-accelerate the computation of the artificial neural network model using the plurality of processing elements 110 and the SFU 150.

The NPU interface 140 may communicate with various components connected to the NPU 100, for example, memories, via a system bus.

The NPU controller 130 may include a scheduler configured to control the operation of multiple processing elements 110 for inference operations of a neural processing unit 100, as well as operations of the SFU 150 and reading and writing order of the internal memory 120 of the NPU.

The scheduler in the NPU controller 130 may be configured to control the plurality of processing elements 110, the SFU 150, and the NPU internal memory 120 based on data locality information or structure information of the artificial neural network model.

The schedular in the NPU controller 130 may analyze or receive analyzed information on a structure of an artificial neural network model which may operate in the plurality of processing elements 110. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU controller 130 or the NPU internal memory 120.

The scheduler in the NPU controller 130 may schedule an operation order of the artificial neural network model to be processed by an NPU 100 based on the data locality information or the information about the structure of the artificial neural network model.

The scheduler in the NPU controller 130 may acquire a memory address value in which feature map of a layer of the artificial neural network model and weight data are stored based on the data locality information or the information about the structure of the artificial neural network model. For example, the scheduler in the NPU controller 130 may acquire the memory address value of the feature map of the layer of the artificial neural network model and the weight data which are stored in the memory. Accordingly, the scheduler in the NPU controller 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The scheduler in the NPU controller 130 may schedule an operation order of the plurality of processing elements 110 based on the data locality information or the information about the structure of the artificial neural network model, for example, the layout information of layers of the artificial neural network or the information about the structure of the artificial neural network model.

The scheduler in the NPU controller 130 may schedule based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the scheduler in the NPU controller 130 may control the NPU 100 according to a determined processing order of the NPU 100 based on the data locality information or the information about the structure of the artificial neural network model.

Moreover, the scheduler in the NPU controller 130 may operate the NPU 100 according to the determined the processing order based on the data locality information or the information about the structure of the artificial neural network model and/or data locality information or information about a structure of the NPU 100 to be used.

However, the present disclosure is not limited to the data locality information or the information about the structure of the NPU 100.

The scheduler in the NPU controller 130 may be configured to store the data locality information or the information about the structure of the artificial neural network.

That is, even though only the data locality information or the information about the structure of the artificial neural network of the artificial neural network model is utilized, the scheduler in the NPU controller 130 may determine a processing sequence.

Moreover, the scheduler in NPU controller 130 may determine the processing order of the NPU 100 by considering the data locality information or the information about the structure of the artificial neural network model and data locality information or information about a structure of the NPU 100. Furthermore, optimization of the processing is possible according to the determined processing order.

The plurality of processing elements 110 refers to a configuration in which a plurality of processing elements PE1 to PE12 configured to operate feature map and weight data of the artificial neural network is disposed. Each processing element may include a multiply and accumulate (MAC) operator and/or an arithmetic logic unit (ALU) operator, but the examples according to the present disclosure are not limited thereto.

Each processing element may be configured to optionally further include an additional special function unit for processing the additional special functions.

For example, it is also possible for the processing element PE to be modified and implemented to further include a batch-normalization unit, an activation function unit, an interpolation unit, and the like.

The SFU 150 may include each processing circuit configured to select and process activation function operation, pooling operation, stride operation, batch-normalization operation, skip-connection operation, concatenation operation, quantization operation, clipping operation, padding operation, and the like according to the architecture of the artificial neural network. That is, the SFU 150 may include a plurality of special function arithmetic processing circuit units.

Figure 5:
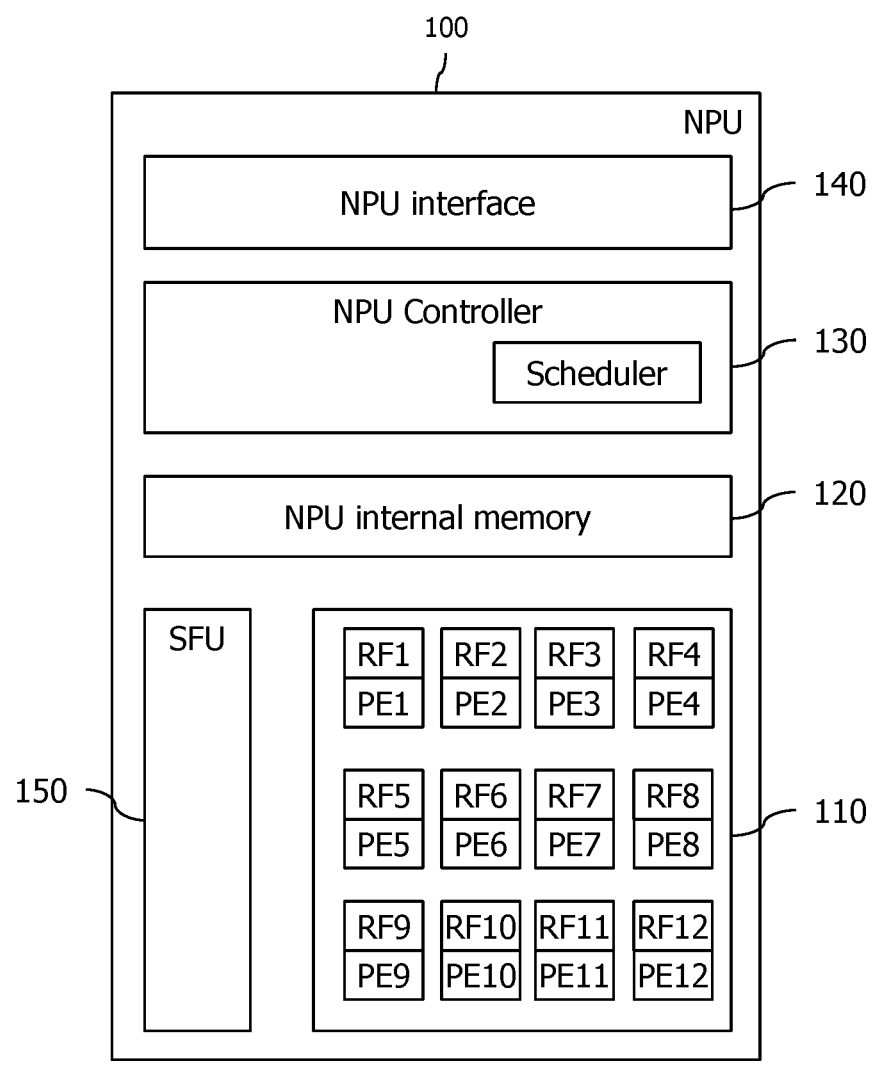
FIG. 5 is an schematic diagram illustrating a modified example of the NPU 100 shown in FIG. 3.

Even though FIG. 5 illustrates a plurality of processing elements as an example, operators implemented by a plurality of multiplier and adder trees may also be configured to be disposed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 5 is just an example for the convenience of description and the number of the plurality of processing elements PE1 to PE12 is not limited to 12. The size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A number of the plurality of processing elements 110 may be designed in consideration of the characteristic of the artificial neural network model in which the NPU 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 4A:
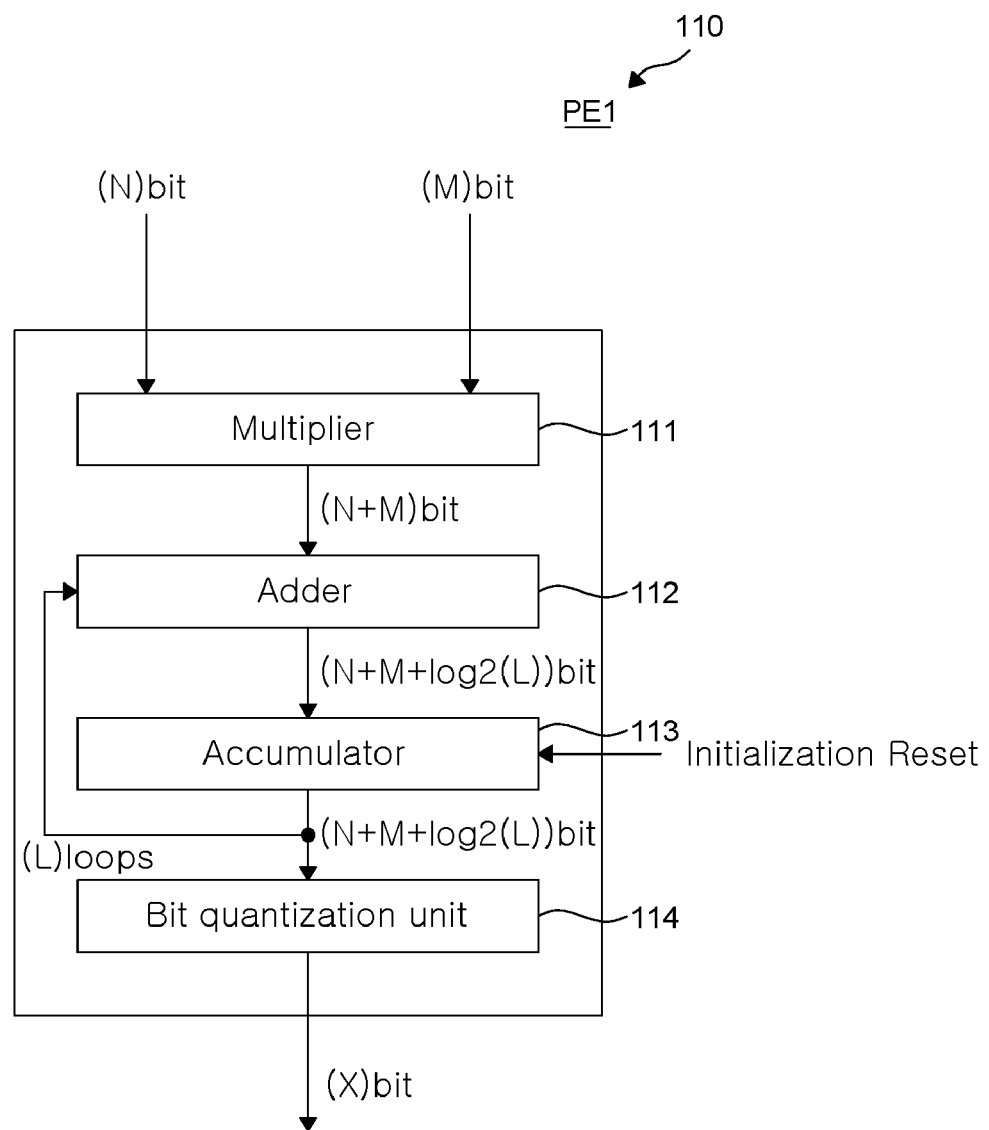
FIG. 4A is a diagram illustrating one processing element among a plurality of processing elements that may be applied to the present disclosure.

FIG. 4A illustrates one processing element among a plurality of processing elements that may be applied to the present disclosure.

The NPU 100 according to the examples of the present disclosure may include the plurality of processing elements 110, the NPU internal memory 120 configured to store an artificial neural network model inferred from the plurality of processing elements 110, and the NPU controller 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

The first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited to this arrangement.

The bit quantizer 114 may reduce the bit width of the data output from the accumulator 113. The bit quantizer 114 may be controlled by the NPU controller 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Specifically, when the heat generation is reduced, the possibility of the erroneous operation of the NPU 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU controller 130 may also be configured to extract quantized information by analyzing the artificial neural network model. Accordingly, the output data (X) bit is converted to a quantized bit width to be output to correspond to the quantized data size. The output data (X) bit of the bit quantizer 114 may be stored in the NPU internal memory 120 with a quantized bit width.

The plurality of processing elements 110 of the NPU 100 according to an example of the present disclosure may include a multiplier 111, an adder 112, and an accumulator 113. The bit quantizer 114 may be selected according to whether quantization is applied or not.

Figure 4B:
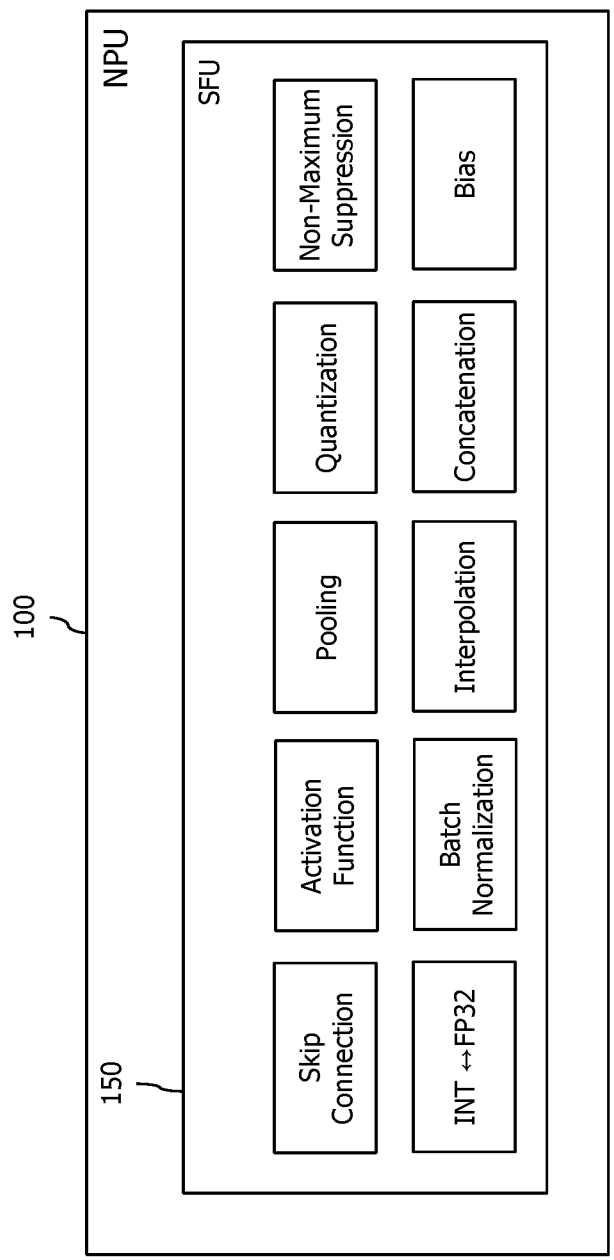
FIG. 4B is a diagram illustrating an SFU that can be applied to the present disclosure.

FIG. 4B is a schematic conceptual diagram illustrating an SFU that can be applied to the present disclosure.

Referring to FIG. 4B, the SFU 150 may include several functional units. Each functional unit can be operated selectively. Each functional unit can be selectively turned on or off. That is, each functional unit can be selectively set.

In other words, the SFU 150 may include various circuit units required for an artificial neural network inference operation.

For example, the circuit units of the SFU 150 may include a functional unit for skip-connection operation, a functional unit for activation function operation, a functional unit for pooling operation, a functional unit for quantization operation, a functional unit for non-maximum suppression (NMS) operation, a functional unit for integer to floating point conversion (INT to FP32) operation, a functional unit for a batch-normalization operation, a functional unit for an interpolation operation, a functional unit for a concatenation operation, a functional unit for a bias operation, and the like.

Functional units of the SFU 150 may be selectively turned on or off according to the data locality information of the artificial neural network model. Data locality information of an artificial neural network model may include turn-off of a corresponding functional unit or control information related to turn-off when an operation for a specific layer is performed.

An activated unit among functional units of the SFU 150 may be turned on. In this way, when some functional units of the SFU 150 are selectively turned off, power consumption of the NPU 100 can be reduced. Meanwhile, in order to turn off some functional units, power gating may be used. Alternatively, clock gating may be performed to turn off some functional units.

FIG. 5 illustrates a modified example of the neural processing unit 100 of FIG. 3.

The NPU 100 of FIG. 5 is substantially the same as the NPU 100 schematically illustrated in FIG. 3, except for the plurality of processing elements 110. Thus, redundant description will be omitted for brevity.

The plurality of processing elements 110 exemplarily illustrated in FIG. 5 may further include register files RF1 to RF12 corresponding to processing elements PE1 to PE12 in addition to a plurality of processing elements PE1 to PE12.

The plurality of processing elements PE1 to PE12 and the plurality of register files RF1 to RF12 of FIG. 5 are just an example for the convenience of description and the number of the plurality of processing elements PE1 to PE12 and the plurality of register files RF1 to RF12 is not limited to 12.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the NPU 100 operates. For additional explanation, the memory size of the register file may be determined in consideration of a data size, a required operating speed, and a required power consumption of the artificial neural network model to operate.

The register files RF1 to RF12 of the NPU 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

<A Mobile Device to which the Present Disclosures are Applied>

Figure 6A:
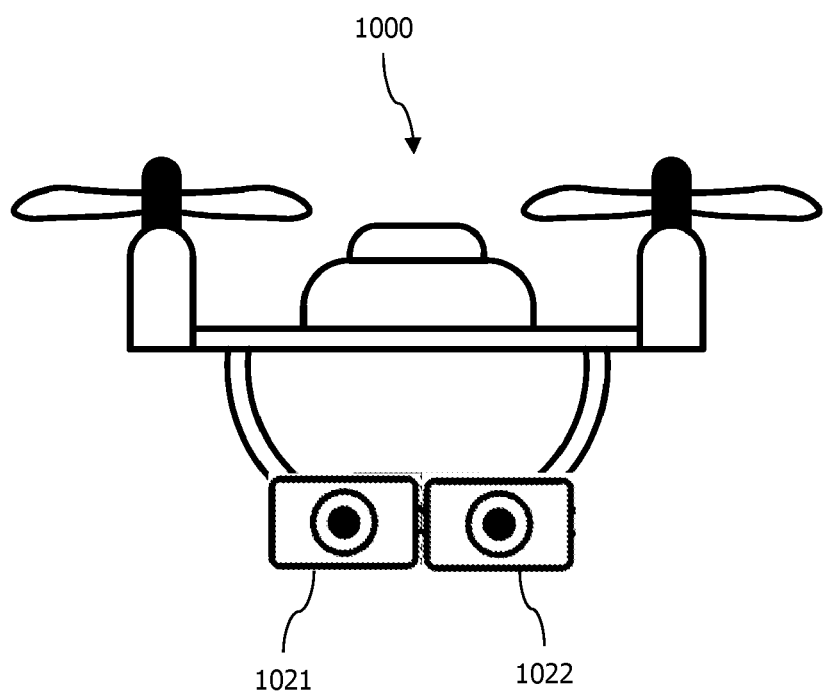
FIGS. 6A and 6B illustrating examples of drones to which the present disclosures are applied and applicable.
Figure 6B:
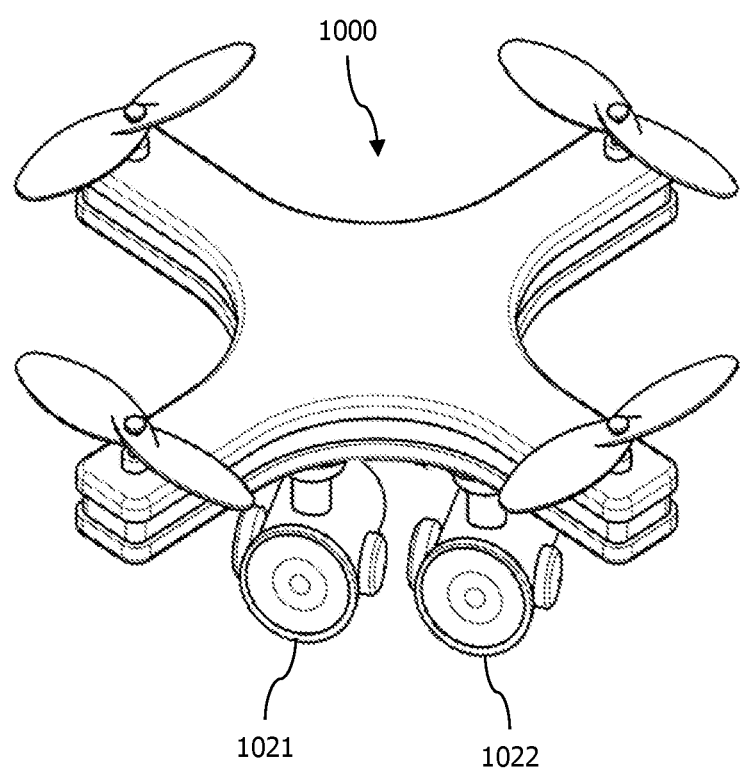

FIGS. 6A and 6B show examples of drones to which the present disclosures are applied.

Referring to FIGS. 6A and 6B, a movable apparatus having an advanced artificial intelligence object recognition function may capture an image of a moving target object while tracking the target object.

A device according to the present disclosure may be configured to automatically steer a camera. Specifically, it may be configured to detect or track a specific subject (e.g., an arbitrary person) within an image captured by a camera installed in the device by controlling the camera. It is noted that throughout this disclosure, the word of "device" and the word of "apparatus" are interchangeable unless specified otherwise.

A device according to the present disclosure is configured to predict a path or direction in which a target subject will move using the its onboard NPU. Accordingly, it may be configured to automatically steer a movable apparatus or camera in a path or direction predicted by the device.

Referring to FIGS. 6A and 6B, one or a plurality of cameras may be mounted on the movable apparatus 1000. The plurality of cameras may include a first camera 1021 and a second camera 1022.

For example, the first camera 1021 may be a telephoto camera. The second camera 1022 may be a wide-angle camera. That is, the second camera 1022 may have a wider angle of view than the first camera 1021.

Alternatively, the first camera 1021 may be a visible ray camera. The second camera 1022 may be at least one of an ultra violet camera, an infrared camera, a thermal imaging camera, and a night vision camera.

Figure 7:
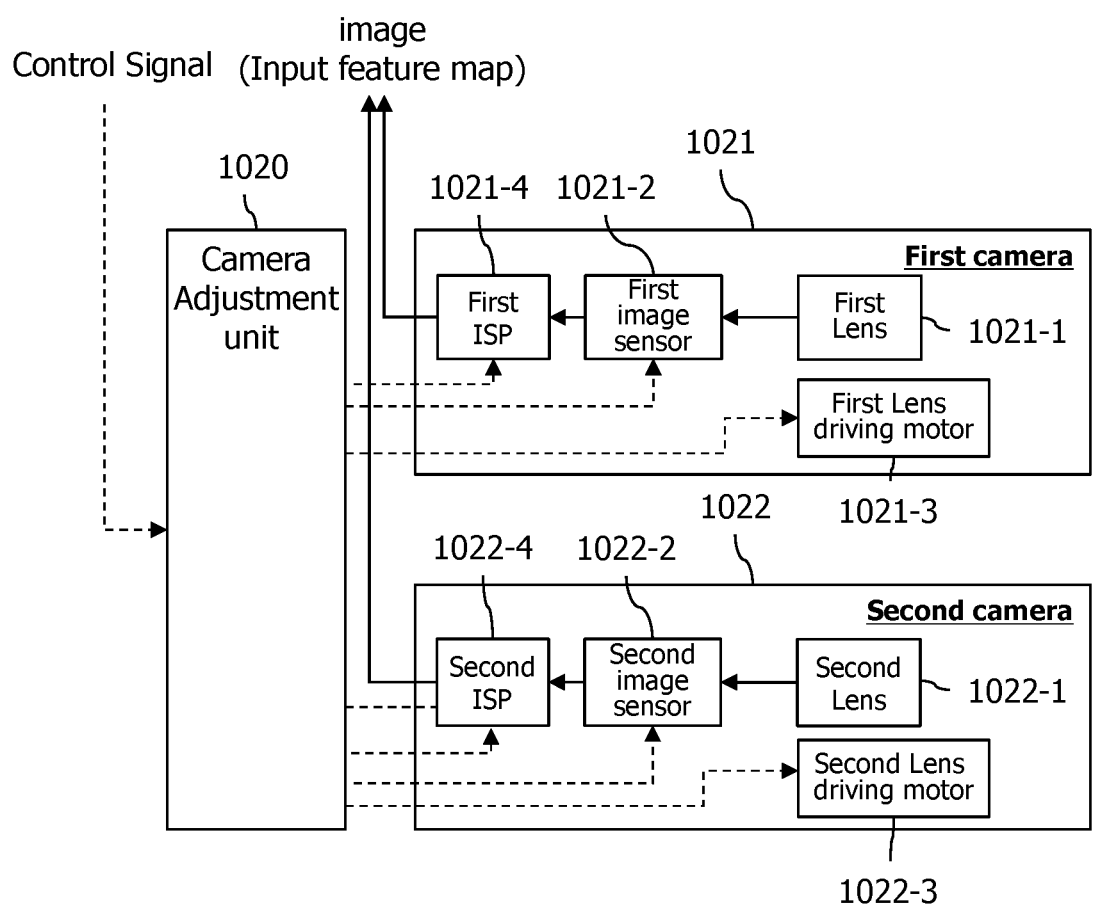
FIG. 7 is a schematic diagram illustrating configurations of a plurality of cameras shown in FIGS. 6A and 6B.

FIG. 7 is schematic diagrams illustrating configurations of a plurality of cameras shown in FIGS. 6A and 6B.

Referring to FIG. 7, the first camera 1021 may include a first lens 1021-1, a first image sensor 1021-2, a first lens driving motor 1021-3 physically adjusting the first lens 1021-1, and a first image signal processor (ISP) 1021-4.

The second camera 1022 may include a second lens 1022-1, a second image sensor 1022-2, a second lens driving motor 1022-3 physically adjusting the second lens 1022-1, and a second ISP 1022-4.

The first camera 1021 and the second camera 1022 may be connected to the camera adjustment unit 1020.

The camera adjustment unit 1020 may be connected to the first ISP 1021-4, the first image sensor 1021-2, and the first lens driving motor 1021-3 of the first camera 1021 to control them (i.e., 1021-2, 1021-3, 1021-4).

The camera adjustment unit 1020 may be connected to the second ISP 1022-4, the second image sensor 1022-2, and the second lens driving motor 1022-3 of the second camera 1022 to control them (i.e., 1022-2, 1022-3, 1022-4).

The first lens driving motor 1021-3 may physically adjust the first lens 1021-1 or the first image sensor 1021-2. Accordingly, a distance between the first lens 1021-1 and the first image sensor 1021-2 may be increased or decreased under the adjustment. Accordingly, zoom-in or zoom-out is achieved. Also, the first lens driving motor 1021-3 may move or rotate the first lens 1021-1 in the X, Y, and Z-axis directions. Accordingly, an angle of view, a focal length, an optical zoom, and the like of an image output by the first camera 1021 may be adjusted under the first lens driving motor 1021-3 control.

The second lens driving motor 1022-3 may physically adjust the second lens 1022-1 or the second image sensor 1022-2. Accordingly, a distance between the second lens 1022-1 and the second image sensor 10222-2 may be increased or decreased under the adjustment. Accordingly, zoom-in or zoom-out is achieved. Also, the second lens driving motor 1022-3 may move or rotate the second lens 1022-1 in the X, Y, and Z-axis directions. Accordingly, an angle of view, focal length, optical zoom, and the like of an image output by the second camera 1022 may be adjusted under the first lens driving motor 1021-3 control.

The camera adjustment unit 1020 may be configured to control the first lens driving motor 1021-3. The first lens driving motor 1021-3 may be configured to move, yaw, or pitch rotate the first camera 1021 in the X, Y, and Z-axis directions.

The camera adjustment unit 1020 may be configured to control the second lens driving motor 1022-3. The second lens driving motor 1022-3 may be configured to move, yaw, or pitch rotate the second camera 1022 in the X, Y, and Z-axis directions.

The camera adjustment unit 1020 may control the first image sensor 1021-2 or the first ISP 1021-4 of the first camera 1021. The camera adjustment unit 1020 may control the first image sensor 1021-2 so that the first camera 1021 may capture a higher (or lower) resolution image. The first ISP 1021-4 may be configured to downscale (or downsize) the captured image. The camera adjustment unit 1020 may control the second image sensor 1022-2 or the second ISP 1022-4 of the second camera 1022. The camera adjustment unit 1020 may control the second image sensor 1022-2 so that the first camera 1022 may capture a higher (or lower) resolution image. The first ISP 1022-4 may be configured to downscale (or downsize) the captured image.

Figure 8:
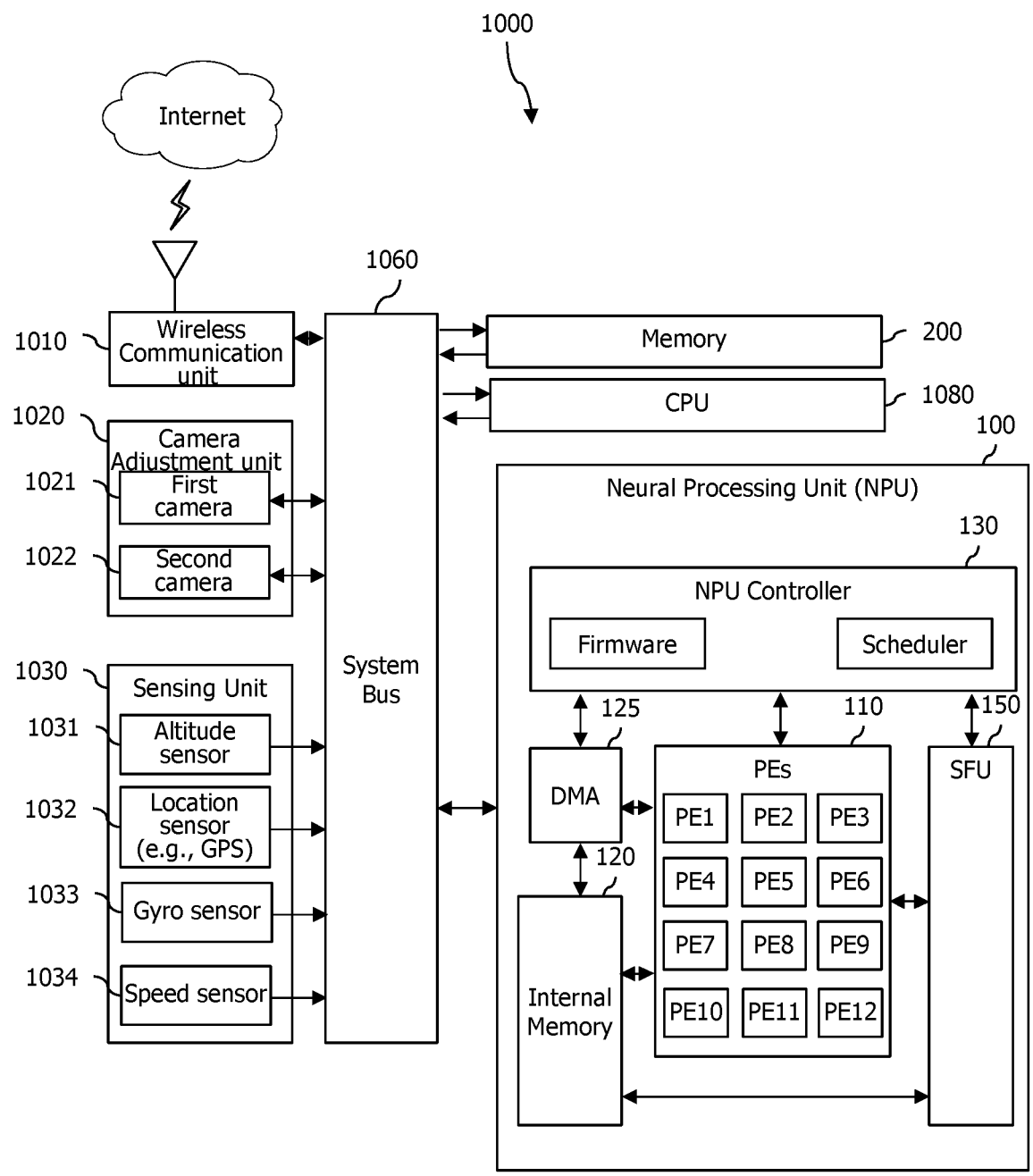
FIG. 8 is a block diagram illustrating the configuration of the drone shown in FIGS. 6A and 6B.

FIG. 8 is a block diagram showing the configuration of the movable apparatus shown in FIGS. 6A and 6B as an example.

Referring to FIG. 8, a movable apparatus 1000 may include an NPU 100 (as shown in FIG. 1 or 3), a memory 200, a wireless communication unit 1010, a camera adjustment unit 1020, a sensing unit 1030, a system bus 1060, and a CPU 1080.

The wireless communication unit 1010 may include one or more of a 4G communication unit, a 5G communication unit, a 6G communication unit, and a short-range communication unit. The 4G communication unit may be for Long Term Evolution (LTE) or LTE-Advanced (LTE-A). The 5G communication unit may be for 5G New Radio (NR). The short-range communication unit may support, for example, Wireless LAN (WLAN), Wi-Fi (Wireless-Fidelity), Wi-Fi (Wireless Fidelity) Direct, Bluetooth™, Radio Frequency Identification (RFID), Infrared Data Association (IrDA), Ultra-Wideband (UWB), ZigBee, Near Field Communication (NFC), Wireless Universal Serial Bus (Wireless USB), and the like.

The wireless communication unit 1010 may be used to transmit/receive a signal for adjusting the flight of a movable apparatus, transmit a captured image, or transmit an inference result by the NPU.

Referring to FIG. 8, the camera adjustment unit 1020 may receive a control signal (or determination data) from the outside.

The camera adjustment unit 1020 may be configured to control the first image sensor 1021-2, the first lens driving motor 1021-3, and/or the first ISP 1021-4 of the first camera 1021 by a control signal (or determination data). The camera adjustment unit 1020 may provide a control signal (or determination data) corresponding to at least one of the first image sensor 1021-2, the first lens driving motor 1021-3, and the first ISP 1021-4 based on the received control signal (or determination data).

The camera adjustment unit 1020 may be configured to control the second image sensor 1022-2, the second lens driving motor 1022-3, and/or the second ISP 1022-4 of the second camera 1022 by a control signal (or determination data). The camera adjustment unit 1020 may provide a control signal (or determination data) corresponding to at least one of the second image sensor 1022-2, the second lens driving motor 1022-3, and the second ISP 1022-4 based on the received control signal (or determination data).

Here, a control signal (or determination data) input to the camera adjustment unit 1020 and a control signal (or determination data) input to the first image sensor 1021-2, the first lens driving motor 1021-3, and the first ISP 1021-4 may be substantially the same signal.

The camera adjustment unit 1020 may control the first image sensor 1021-2 or the first ISP 1021-4 by transmitting a control signal (or determination data) to the first image sensor 1021-2 or the first ISP 1021-4.

The camera adjustment unit 1020 may control the second image sensor 1022-2 or the second ISP 1022-4 by transmitting a control signal (or determination data) to the second image sensor 1022-2 or the second ISP 1022-4.

The camera adjustment unit 1020 may transmit a control signal (or determination data) to the first image sensor 1021-2 so that the first image sensor 1021-2 of the first camera 1021 can adjust the resolution and/or frame rate per second (FPS) of the captured image.

The camera adjustment unit 1020 may transfer a control signal (or determination data) to the first ISP 1021-4 to allow the first ISP 1021-4 of the first camera 1021 to downscale or upscale the captured image.

The camera adjustment unit 1020 may transmit a control signal (or determination data) to the second sensor 1022-2 so that the second image sensor 1022-2 of the second camera 1022 can adjust the resolution and/or frame rate per second (FPS) of the captured image.

The camera adjustment unit 1020 may transfer a control signal (or determination data) to the second ISP 1022-4 to allow the second ISP 1022-4 of the second camera 1022 to downscale or upscale the captured image.

The sensing unit 1030 may include an altitude sensor 1031, a location sensor (e.g., GNSS (Global Navigation Satellite System) or GPS) 1032, a gyro sensor (i.e., angular velocity sensor) 1033, and a speed sensor 1034. The altitude sensor 1031 may measure the height at which the movable apparatus 1000 is floating from the ground. The location sensor 1032 may measure location coordinates of the movable apparatus 1000. Also, the location sensor 1032 may measure the height at which the movable apparatus 1000 is suspended from the ground. The speed sensor 1034 can measure acceleration as well as speed of the movable apparatus 1000. The sensing unit 1030 may transmit the measured data to the CPU 1080, to the Internet through the wireless communication unit 1010 or to a terminal of a user who controls the movable apparatus 1000 through the wireless communication unit 1010.

The system bus 1060 may provide an interface connecting between the wireless communication unit 1010, the camera adjustment unit 1020, the sensing unit 1030, the memory 200, the CPU 1080, and the NPU 100.

The memory 200 may store information about an artificial neural network model. The artificial neural network model may be a type of CNN, such as Yolo (You Only Look Once). Information about the artificial neural network model stored in the memory 200 may include information about the number of layers of the artificial neural network model, the number of channels per layer, and a weight matrix used for each channel in each layer.

Specifically, the memory 200 may include a machine code storage unit, an image storage unit, an output feature map storage unit, and a weight storage unit for each machine code, as will be described later with reference to FIG. 16.

As shown in FIG. 3 or FIG. 5, the NPU 100 may include a plurality of processing elements 110, an internal memory 120, an NPU controller 130, a special function unit (SFU) 150, and a direct memory access (DMA) 125 that accesses and controls the internal memory 120. Also, although not shown in FIG. 8, the NPU 100 may further include an NPU interface 140 as shown in FIG. 3 or FIG. 5.

The plurality of processing elements 110 and/or SFU 150 in the NPU 100 may perform operation of the trained artificial neural network model for each layer of the artificial neural network model to output an inference result for detecting or tracking a subject that is at least one object.

If at least one object is detected or tracked with a confidence level less than the first threshold, an NPU 100 and/or a CPU 1080 may generate a control signal (or determination data) including a command for mechanically or electrically controlling the first camera 1021 or the second camera 1022 to increase the accuracy of detection or tracking.

The confidence level may be a value of 0 to 1, and the confidence level of 0.0 may mean that the inference accuracy of the detected object class is 0%. A confidence level of 0.5 may mean that the inference accuracy of the class of the sensed object is 50%. A confidence level of 1.0 may mean that the inference accuracy of the class of the sensed object is 100%. The threshold value may be a value of between 0 to 1, inclusively.

Figure 9A:
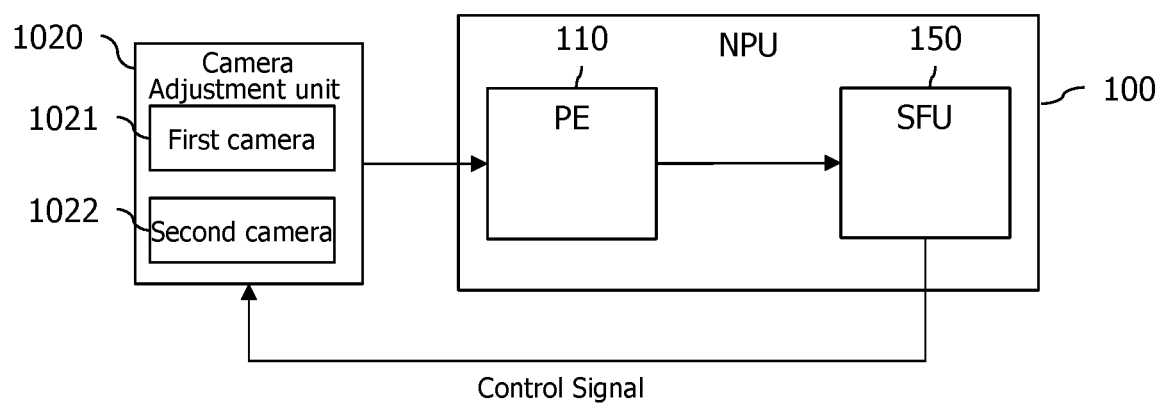
FIGS. 9A to 9C are block diagrams illustrating the configuration shown in FIG. 8 from an operational point of view according to a first disclosure.

For example, specifically, as shown in FIG. 9A, the SFU 150 in the NPU 100 may be configured to further include circuitry configured to generate determination data. Accordingly, the SFU 150 may be configured to generate a control signal including determination data. Alternatively, the NPU controller 130 within the NPU 100 may be configured to generate control signals including commands. To this end, the NPU controller 130 in the NPU 100 may control the PE 110 and/or the SFU 150 to receive the inference result of the artificial neural network model. The SFU 150 may be configured to generate a control signal (or determination data) of the camera adjustment unit 1020 based on the confidence level of the inference result.

Figure 9B:
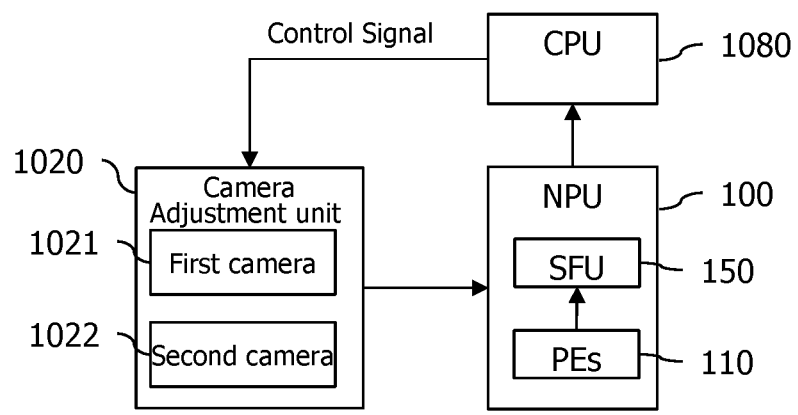

Alternatively, as shown in FIG. 9B, CPU 1080 may be configured to generate a control signal that includes determination data. To this end, the CPU 1080 may receive an inference result from the NPU 100.

Figure 9C:
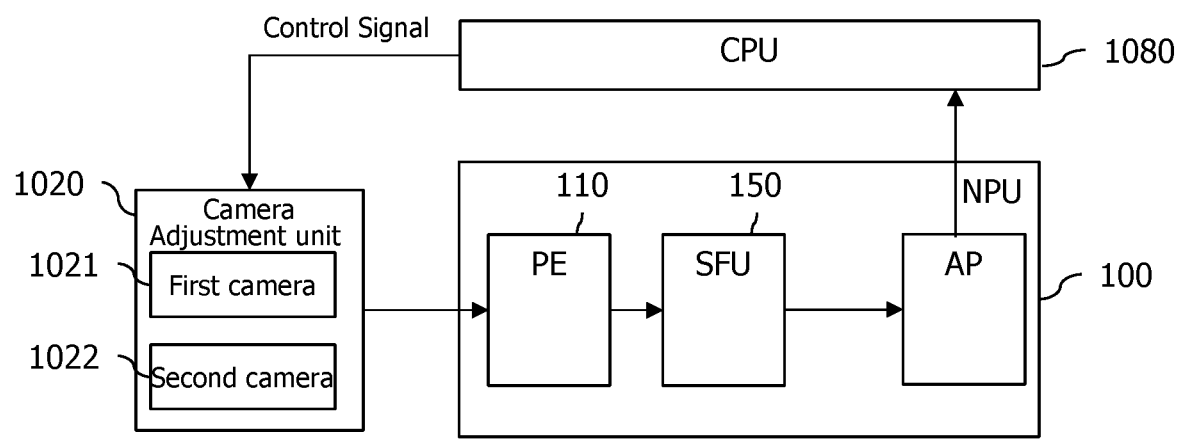

Alternatively, as shown in FIG. 9C, the NPU 100 may further include an application processor (AP). The AP may be configured to generate control signals containing determination data instead of the SFU 150.

As described above, the NPU 100 may be configured to transmit a control signal (or determination data) to the camera adjustment unit 1020 in order to increase the accuracy of detection or tracking. Specifically, the NPU 100 may determine whether at least one object is detected or tracked with a confidence level lower than the first threshold. If at least one object is detected or tracked with a confidence level lower than the first threshold, a control signal (or determination data) may be generated and transmitted to the camera adjustment unit 1020. As described above, the NPU 100 may be configured to transmit a control signal (or determination data) to the camera adjustment unit 1020 in order to increase the accuracy of detection or tracking. Specifically, the NPU 100 may determine whether at least one object is detected or tracked with a confidence level lower than the first threshold. If at least one object is detected or tracked with a confidence level lower than the first threshold, a control signal (or determination data) may be generated and transmitted to the camera adjustment unit 1020.

For example, after receiving the processed detection or tracking result, the NPU controller 130, SFU 150, or AP in the NPU 100, may determine whether at least one object is detected or tracked with a confidence level less than a first threshold. If at least one object is detected or tracked with a confidence level lower than the first threshold, then after generating a control signal (or determination data), the NPU controller 130, the SFU 150, or the AP in the NPU 100 may transmit the control signal to the camera adjustment unit 1020.

The internal memory 120 of the NPU 100 may retrieve and temporarily store parameters for the artificial neural network model trained to output inference results for detecting or tracking at least one object from the memory 200 through the system bus 1060 using the DMA 125. The internal memory 120 of the NPU 100 may temporarily store parameters such as an input feature map, an output feature map, an activation map, and a weight kernel for operation of an artificial neural network model.

Specifically, the configuration of the internal memory 120 of the NPU 100 may be different depending on the structure of the artificial neural network model. For example, in the case of NPU 100 configured to process a CNN model, the internal memory 120 in the NPU 100 may include an input feature map storage unit, an output feature map storage unit, and a weight storage unit. However, this will be described in detail later with reference to FIG. 16.

The NPU controller 130 in the NPU 100 may further include a firmware storage unit in addition to the scheduler shown in FIG. 3 or 5.

The firmware storage unit may store, for example, a set of compiled machine codes and a set of commands. Alternatively, the set of plurality of machine codes may be stored in the internal memory 120.

For example, a set of plurality of machine codes may include a first set of machine code for a first artificial neural network model using an input feature map of a first size (e.g., 200×200×3) and a second set of machine code for a second artificial neural network model using an input feature map of a second size (e.g., 320×320×3). Additionally, the set of plurality of machine codes may further include a third set of machine codes for a third artificial neural network model using an input feature map of a third size (e.g., 400×400×3). In other words, the size of the input feature map may be changed according to a control signal (or determination data). Accordingly, a plurality of machine codes corresponding to the sizes of the plurality of input feature maps must be compiled respectively. In addition, the NPU 100 may switch to a corresponding machine code when the size of the input feature map is changed.

For example, a plurality of sets of machine codes may be configured to include different artificial neural network models. Here, the first artificial neural network model may have characteristics advantageous to recognizing small objects, and the second artificial neural network model may have characteristics advantageous to recognizing large objects.

In order to compile the machine code of each artificial neural network model, a compiler may be prepared in advance. In order to process a specific artificial neural network model, the compiler may schedule an optimal operation based on the size of an input feature map and structural data of the artificial neural network model. That is, the compiler may generate a machine code that minimizes the frequency of generating access commands to the memory 200 by analyzing the size of data corresponding to each layer of the artificial neural network model, and efficiently using the internal memory 120 of the NPU 100 accordingly.

In addition, the compiler may calculate the optimal number of tiles of the feature map and/or kernel for each layer based on the data size of the weight and feature map of each layer of an artificial neural network model and the memory size of the internal memory 120 of the NPU 100. As the size of the input feature map increases and the memory size of the internal memory 120 decreases, the number of tiles may increase. As the size of the input feature map decreases and the memory size of the internal memory 120 increases, the number of tiles may decrease. Accordingly, the compiler may generate a plurality of sets of machine codes for the artificial neural network model corresponding to the optimal number of tiles. That is, the number of tiles should be compiled differently according to the size of the input feature map.

That is, the number of machine codes included in the set that can be provided may correspond to the number of sizes of switchable input feature maps input to the NPU 100. For example, when the sizes of the switchable input feature maps are (200×200×3) and (400×400×3), the number of machine codes included in the set may be two.

Index information on a set of a plurality of machine codes may be stored in a firmware storage unit in the NPU controller 130. At the initial stage of operation of the movable apparatus 1000, the CPU 1080 may load index information for a plurality of machine code sets from the firmware storage unit in the NPU controller 130, and then store the index information in the cache memory in the CPU 1080.

After determining the movement path or direction of the movable apparatus 1000, the CPU 1080 may control the movable apparatus 1000 to move in the determined movement path or direction. To this end, the CPU 1080 may receive measurement data (i.e., environmental condition data) from the sensing unit 1030.

Specifically, the CPU 1080 may control flight of the movable apparatus 1000. However, the movable apparatus of the present disclosure is not limited to flying objects, and can be extended to devices movable on land, water, and underwater. Specifically, the CPU 1080 may control flight of the movable apparatus 1000. However, the movable apparatus of the present disclosure is not limited to flying objects, and can be extended to devices movable on land, water, underwater, and near-earth space.

For example, the CPU 1080 may determine a flight path, flight speed, and flight altitude of the movable apparatus 1000 while comparing location information measured by the location sensor 1032 with destination location information. In addition, the CPU 1000 may compare the determined flight speed with the determined flight altitude and measurement values obtained from the altitude sensor 1031, the gyro sensor 1033, and the speed sensor 1034 to determine whether the movable apparatus 1000 is in normal flight status. Therefore, the movable apparatus 1000 can continuously control the flight of the movable apparatus 1000.

The CPU 1080 and/or the NPU 100 may receive measurement data (i.e., environmental condition data) from the sensing unit 1030. Also, the CPU 1080 may receive an inference result from the NPU 100. Also, the NPU 1080 may receive images captured by the first camera 1021 and the second camera 1022. The NPU 1080 may transfer a control signal (or determination data) to the camera adjustment unit 1020. The control signal (or determination data) may include a control signal (or determination data) for moving the first camera 1021 and the second camera 1022 in the X, Y, and Z-axis directions. In addition, the control signal (or determination data) may include a control signal (or determination data) for the camera adjustment unit 1020 to rotate the first camera 1021 and the second camera 1022 in a yaw rotation or a pitch rotation. Also, the CPU 1080 may determine a movement path or movement direction of the movable apparatus 1000.

The CPU 1080 may control the movable apparatus 1000 to move in the determined movement path or movement direction.

The CPU 1080 may receive images captured by the first camera 1021 and the second camera 1022. Also, the CPU 1080 may receive an inference result (i.e., an object detection or tracking result) from the NPU 100.

Instead of the NPU controller 130, SFU 150 or AP in the NPU 100, in order to increase the accuracy of detection or tracking, the CPU 1080 may generate a control signal (or determination data) including a command for mechanically or electrically controlling the first camera 1021 or the second camera 1022 and transmit it to the camera controller 1020.

Specifically, when receiving information indicating that at least one object is detected or tracked with a confidence level lower than the first threshold value from the NPU 100, the CPU 1080 may generate a control signal (or determination data) and transmit it to the camera controller 1020. In addition, when the CPU 1080 receives information indicating that at least one object is detected or tracked with a confidence level lower than the first threshold value from the NPU 100, the CPU 1080 may slow down the flight speed for more accurate detection or tracking.

A signal generated by the NPU controller 130, the SFU 150 or the AP, or the signal generated by the CPU 1080 in the NPU 100 may include at least one command.

The at least one command may be used to move or rotate at least one of a body, lens, or image sensor of at least one camera in an X, Y, or Z-axis direction. Alternatively, at least one command may be used to increase or decrease the focal distance of at least one camera. Alternatively, at least one command may be used to yaw or pitch rotate at least one of a body, a lens, or an image sensor of at least one camera.

Alternatively, at least one command may be used to increase or decrease the angle of view of at least one camera. Alternatively, at least one command may be used to move or rotate the field of view (FoV) of at least one camera in the X, Y, or Z-axis direction. Alternatively, at least one command may be used to increase or decrease a frame per second (FPS) of at least one camera. At least one command may be used to cause at least one camera to zoom-in or zoom-out.

Meanwhile, the at least one command may include the coordinates of at least one object when the at least one object is detected or tracked with a confidence level lower than the first threshold value.

The at least one command comprising the coordinates of the at least one object may be used to enable the at least one camera to capture at a larger size an image portion comprising the at least one object. Based on the coordinates of the at least one object, the portion of the image comprising the at least one object may be optically zoomed in or digitally zoomed in and captured at a greater image resolution.

When the first camera 1021 is a wide-angle camera and the second camera 1022 is a telephoto camera, only the field of view (FoV) of the second camera 1022 may be moved or rotated in the X, Y, or Z-axis direction based on at least one command containing the coordinates of at least one object. That is, the first camera 1021 may not be controlled, and only the second camera 1022 may be controlled.

Meanwhile, when the first camera 1021 is a wide-angle camera and the second camera 1022 is a telephoto camera, the first camera 1021 may be used to enable the NPU 100 to detect at least one object, and the second camera 1022 may be used to enable the NPU 100 to track at least one detected object.

A control signal (or determination data) including at least one command may be used to enable the first camera 1021 or the second camera 1022 to capture an image with a higher resolution, that is, a larger size.

On the other hand, the control signal (or determination data) including at least one command may be generated based on environmental condition data, that is, flight altitude or height or flight speed of the movable apparatus 1000.

For example, at least some environmental condition data may be obtained through the sensing unit 1030.

Based on a control signal (or determination data) including at least one command, the first ISP 1021-4 or the second ISP 1022-4 may process an image or a series of images. Since a video or a series of images is input to the NPU 100, they can be called as an input feature map, and the input feature map may correspond to an adjustable input feature map having an adjustable dimension.

In other words, the dimension of the input feature map may be adjustable based on a control signal (or determination data) including at least one command. The dimensions of the input feature map may include the horizontal size and vertical size of the feature map and the number of channels. The resolution or size of the input feature map may be adjustable based on the determination data.

In other words, the control signal (or determination data) including at least one command may control generation of at least one input feature map or control at least one attribute of at least one input feature map. In other words, the control signal (or determination data) including at least one command may control generation of at least one input feature map or control at least one attribute of at least one input feature map.

On the other hand, in order to increase tracking accuracy, the CPU 1080 may select one of a plurality of machine code sets stored in the cache memory and transmit it to the NPU controller 130 of the NPU 100.

More specifically, the CPU 1080 may receive flight altitude information and information about sea level or height from the ground from the altitude sensor 1031 or the location sensor 1032 of the sensing unit 1030.

If the flight altitude is increased (i.e., the height of the movable apparatus from the sea level or the ground is increased), the size of the object in the image may become smaller, and the object may be detected with a confidence level less than the first threshold, or the detection may fail. Therefore, in order to increase the accuracy of detection or tracking, the CPU 1080 may select a plurality of machine code sets suitable for a corresponding altitude from among a plurality of machine code sets. The selected set may be a set of a plurality of machine codes for an artificial neural network model suitable for a corresponding flight altitude. The CPU 1080 may transmit index information on a set of a plurality of machine codes to the NPU controller 130 of the NPU 100.

I. First Disclosure

FIGS. 9A to 9C are block diagrams illustrating the configuration shown in FIG. 8 from an operational point of view according to the first disclosure.

As shown in FIG. 9A, a plurality of processing elements 110 and/or SFU 150 in NPU 100 may perform operation of artificial neural network models. SFU 150 may be configured to further include circuitry configured to generate determination data. Accordingly, the SFU 150 may be configured to generate a control signal including determination data. The NPU 100 may generate an inference result, that is, a detection or tracking result. The NPU 100 may determine or output whether the confidence level of detection or tracking is less than a first threshold value. If it is determined that the confidence level of detection or tracking is less than the first threshold value, the NPU 100 may generate a control signal (or determination data) including a command for mechanically or electrically controlling the first camera 1021 or the second camera 1022 in order to increase the accuracy of detection or tracking. Then, the NPU 100 may transfer a control signal (or determination data) to the camera adjustment unit 1020.

Alternatively, as shown in FIG. 9B, a plurality of processing elements 110 in the NPU 100 may perform operations of artificial neural network models to generate inference results, that is, detection or tracking results. The CPU 1080 may receive an inference result from the NPU 100 and determine whether a confidence level of detection or tracking is lower than a first threshold value. At this time, the CPU 1080 may process the operation of the SFU 150 instead. In other words, since the SFU 150 may be configured as a dedicated accelerator circuit, it may provide a relatively faster processing speed and lower power consumption than the CPU 1080. The CPU 1080 may be loaded with new functions with various software. On the other hand, since the SFU 150 is a circuit with hard-wired hardware, it may be limited in implementing new functions with software.

If it is determined that the confidence level of detection or tracking is less than the first threshold value, the CPU 1080 may generate a control signal (or determination data) including a command for mechanically or electrically controlling the first camera 1021 or the second camera 1022 to increase the accuracy of detection or tracking. Subsequently, the CPU 1080 may transmit a control signal (or determination data) to the camera adjustment unit 1020.

Alternatively, as shown in FIG. 9C, when the plurality of processing elements 110 and/or SFU 150 in the NPU 100 perform an operation of an artificial neural network model and output an inference result, that is, a detection or tracking result, the AP may determine whether the confidence level of detection or tracking is less than a first threshold. At this time, the AP may process the operation of the SFU 150 instead. In other words, since the SFU 150 may be configured as a dedicated accelerator circuit, it may provide a relatively faster processing speed and lower power consumption than the AP. That is, the AP can be loaded with new functions with a variety of software. Meanwhile, since the SFU 150 is a hard-wired circuit, it may be limited in implementing new functions with software.

If it is determined that the confidence level of detection or tracking is lower than the first threshold value, the AP may transmit information on the confidence level of inference result or a camera control request signal to the CPU 1080. Then, the CPU 1080 may generate a control signal (or determination data) including a command for mechanically or electrically controlling the first camera 1021 or the second camera 1022 and then transmit the control signal to the camera adjustment unit 1020 to increase the accuracy of detection or tracking.

Although not shown, when the NPU 100 performs an operation of the artificial neural network model and outputs an inference result, that is, a detection or tracking result, the NPU controller 1030 may determine whether the confidence level of the detection or tracking is less than a first threshold. If it is determined that the confidence level of detection or tracking is less than the first threshold value, the NPU controller 1030 may generate a control signal (or determination data) including a command for mechanically or electrically controlling the first camera 1021 or the second camera 1022 and transmits it to the camera controller 1020 to increase the accuracy of detection or tracking.

Figure 10:
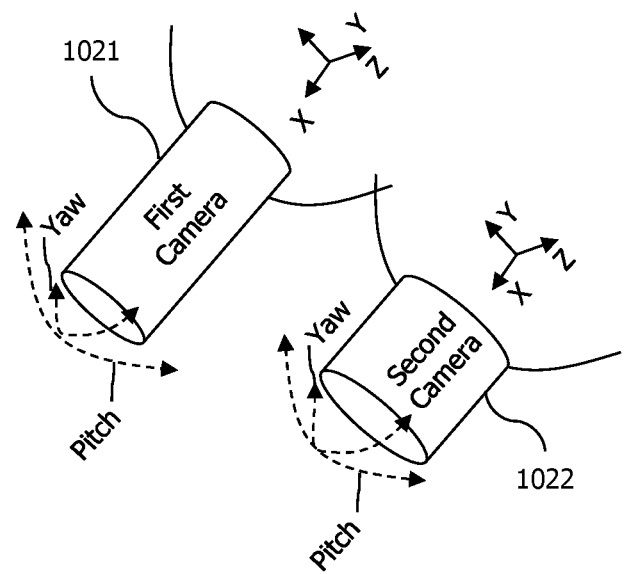
FIG. 10 illustrates an example in which a first camera and a second camera are mechanically controlled according to the first disclosure using the configuration of the drone shown in FIG. 8.
Figure 10:
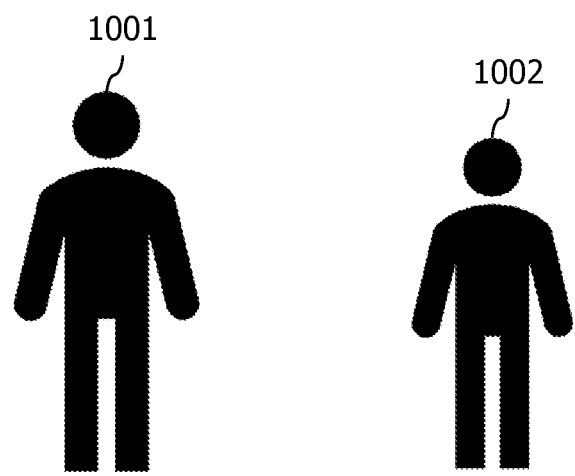

FIG. 10 shows an example in which a first camera and a second camera are mechanically controlled according to the first disclosure using the configuration of the movable apparatus shown in FIG. 8.

As shown in FIG. 10, a first camera 1021 or a second camera 1022 may be used to capture an image including a first subject 1001 and a second subject 1002. The captured image is transmitted to the NPU 100, and the NPU 100 may detect and track the first subject 1001 and the second subject 1002 in the image.

Specifically, the first camera 1021 may be a wide-angle camera, and the second camera 1021 may be a telephoto camera. In this case, the NPU 100 may detect the first subject 1001 and the second subject 1002 through images captured by the first camera 1021. Also, the NPU 100 may track the movement of the first subject 1001 and the second subject 1002 through images captured by the second camera 1022.

Also, the first camera 1021 may be a thermal imaging camera or an ultraviolet camera, and the second camera 1021 may be a visible ray camera. In this case, the NPU 100 may detect the first subject 1001 and the second subject 1002 through images captured by the first camera 1021, and the NPU 100 may object detect and tracking the first subject 1001 and the second subject 1002 through images captured by the second camera 1022. Here, the object detection means recognizing objects of the first subject 1001 and the second subject 1002 and classifying the class (vehicle, airplane, person, and the like) of each object. Furthermore, object detection may mean further extracting specific body features in order to inquire the identities of the first subject 1001 and the second subject 1002 through the database.

Meanwhile, as shown in FIG. 10, each of the first camera 1021 and the second camera 1022 may be moved in the X, Y, or Z-axis direction based on a control signal (or determination data) including a command. Alternatively, each of the first camera 1021 and the second camera 1022 may be yaw rotated or pitch rotated based on a control signal (or determination data) including a command.

Figure 11A:
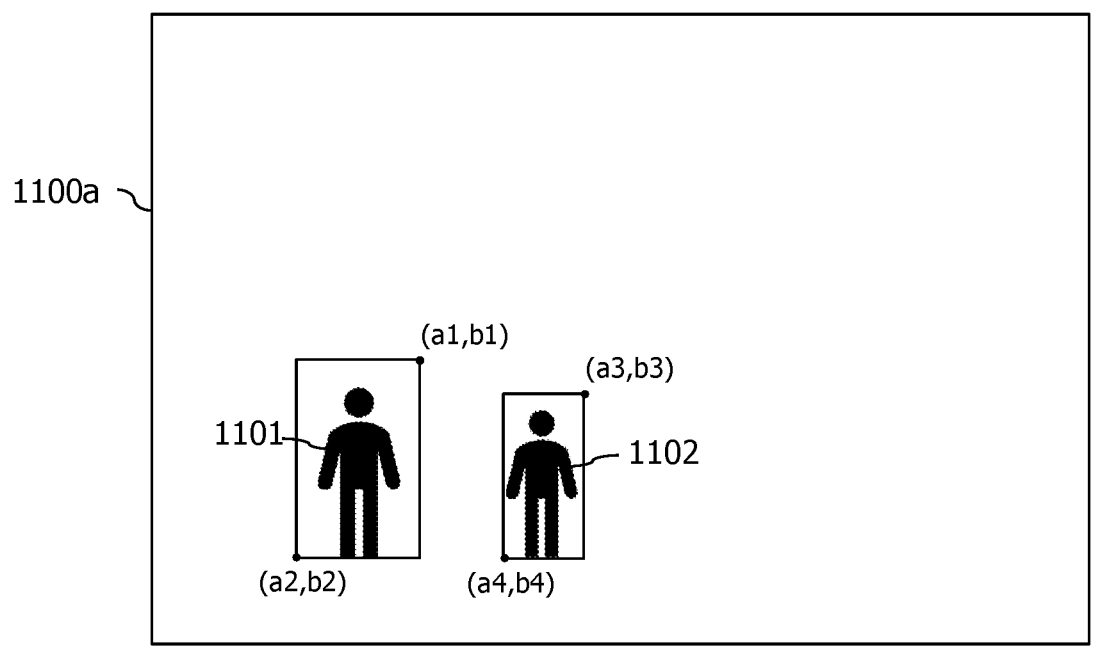
FIGS. 11A and 11B are schematic views illustrating examples of images including a subject.
Figure 11B:
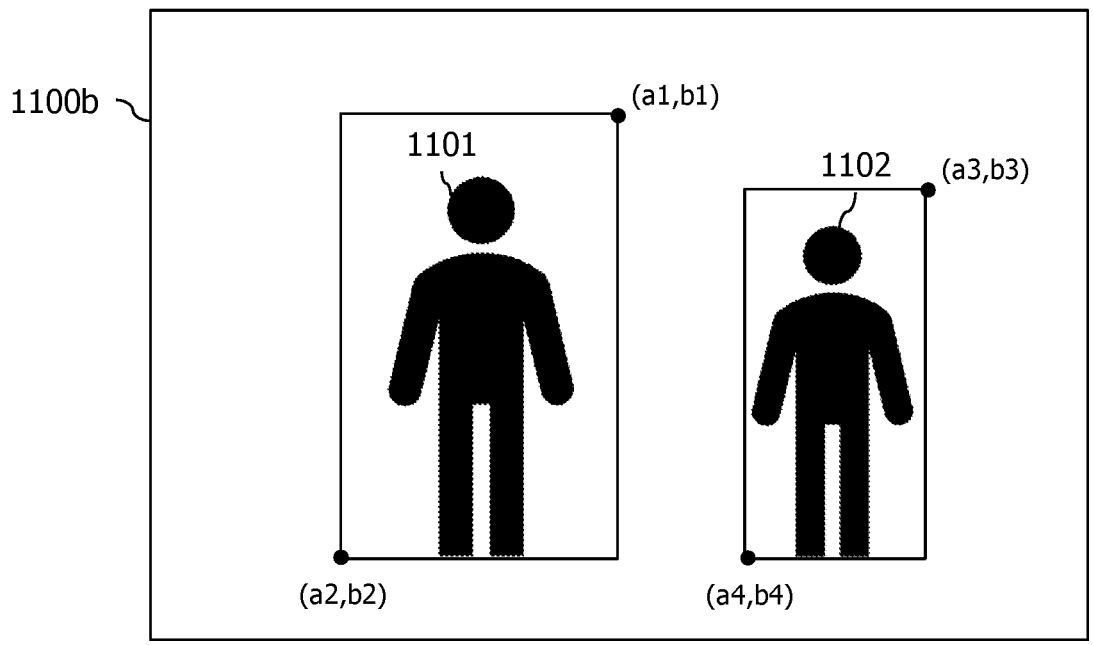

FIGS. 11A and 11B are illustrative views illustrating examples of images including a subject.

As shown in FIG. 11A, the sizes of the first subject 1101 and the second subject 1102 in the image 1100A captured by the first camera 1021 or the second camera 1022 may be relatively too small. In this case, a confidence level of a result of detecting or tracking the first subject 1101 and the second subject 1102 in the image 1100a by the NPU 100 may be lower than the first threshold value. In this case, the NPU 100 may transmit a control signal (or determination data) including a command for mechanically or electrically controlling the first camera 1021 or the second camera 1022 to the camera adjustment unit 1020 to increase the accuracy of detection or tracking. In this case, the command may include coordinate values of the first subject 1101 and the second subject 1102. In this case, each subject may be represented by two pairs of coordinate values. For example, the first subject 1101 may be expressed as a coordinate value pair (a1, b1) and a coordinate value pair (a2, b2). The second subject 1102 may be expressed as a coordinate value pair (a3, b3) and a coordinate value pair (a4, b4).

Based on the command containing the coordinate value, in order for the first camera 1021 or the second camera 1022 to capture the first subject 1101 and the second subject 1102 in a larger size, the camera adjustment unit 1020 may move, yaw rotate, or pitch rotate at least one of the body, lens, or image sensor of the first camera 1021 or the second camera 1022 in the X, Y, or Z-axis direction. As the result of the camera adjustment, subjects are captured in a larger size as shown in FIG. 11B.

Referring to FIG. 11B, in comparison with FIG. 11A, FIG. 11B is illustrated such that the first subject 1101 and the second subject 1102 are captured in a larger size in image 1100b.

Figure 12:
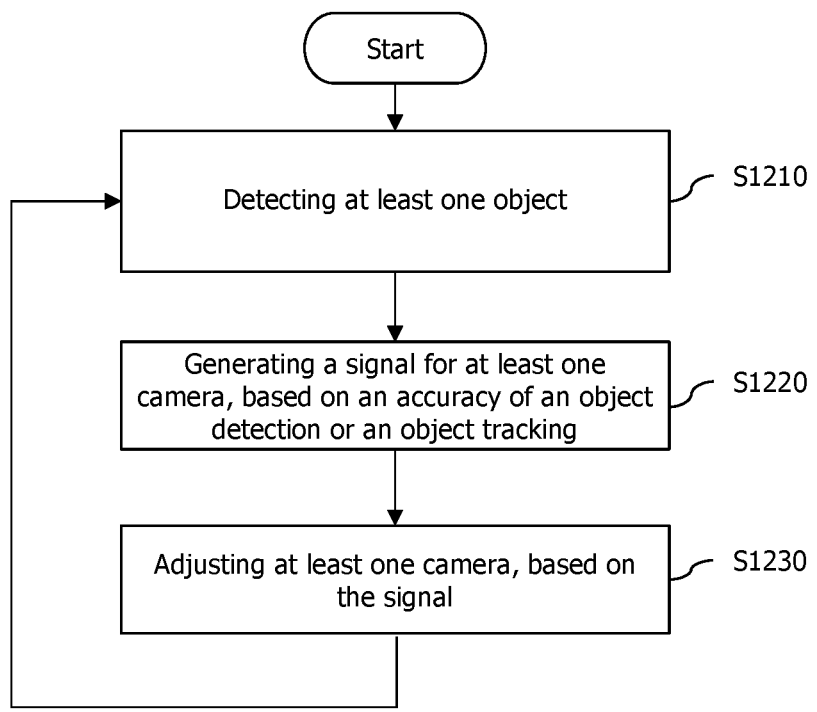
FIG. 12 is a flow chart illustrating an approach according to the first disclosure.

FIG. 12 is a flow chart illustrating an approach according to the first disclosure.

Referring to FIG. 12, at least one object may be detected or tracked based on one or more images acquired from one or more cameras S1210. That is, the first disclosure is not limited to a plurality of cameras, and may be implemented with only one camera.

In order to increase the accuracy of detection or tracking, a signal including at least one command for mechanically or electrically controlling at least one camera may be generated S1220.

Next, based on the generated signal, at least one camera may be mechanically or electrically controlled S1230.

Next, based on the subsequent image obtained from the at least one camera mechanically or electrically controlled based on the generated signal, sensing or tracking of the at least one object may be continued.

II. Second Disclosure

Figure 13A:
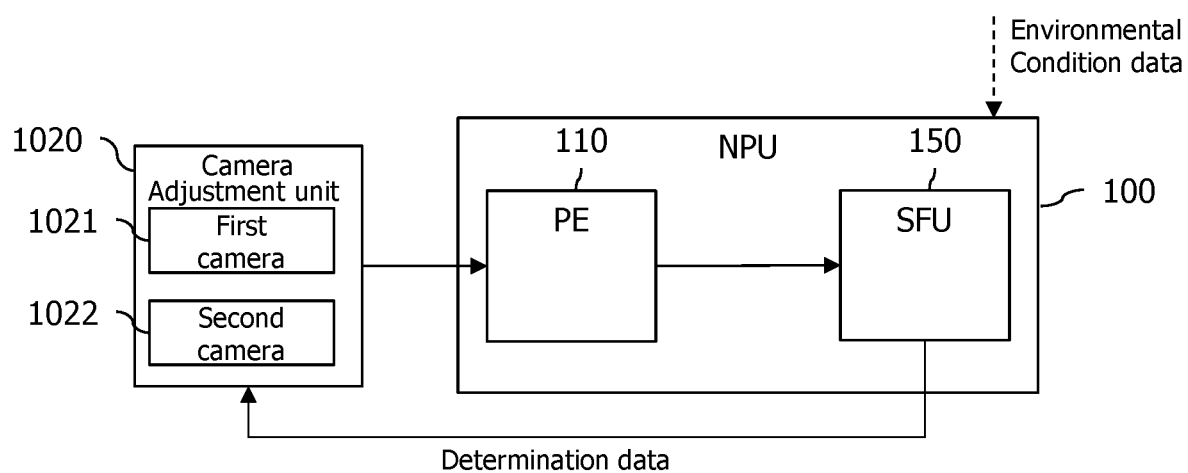
FIGS. 13A to 13C are block diagrams illustrating the configuration shown in FIG. 8 from an operational point of view according to a second disclosure.
Figure 13B:
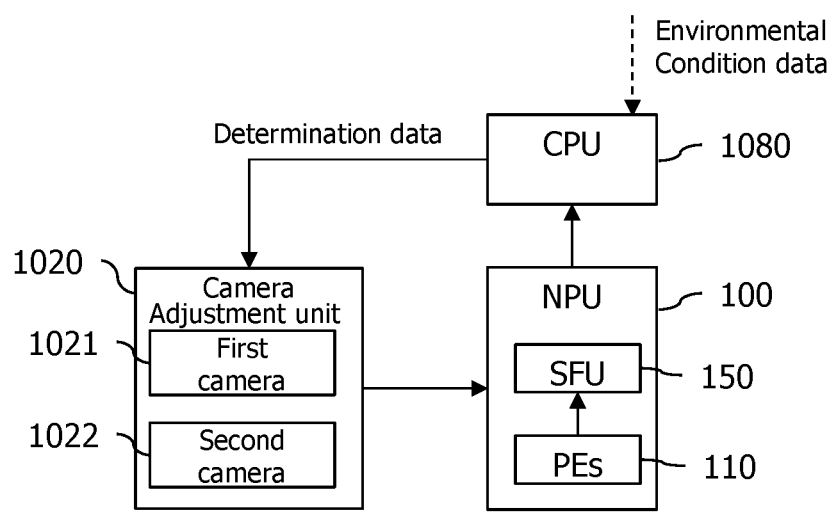
Figure 13C:
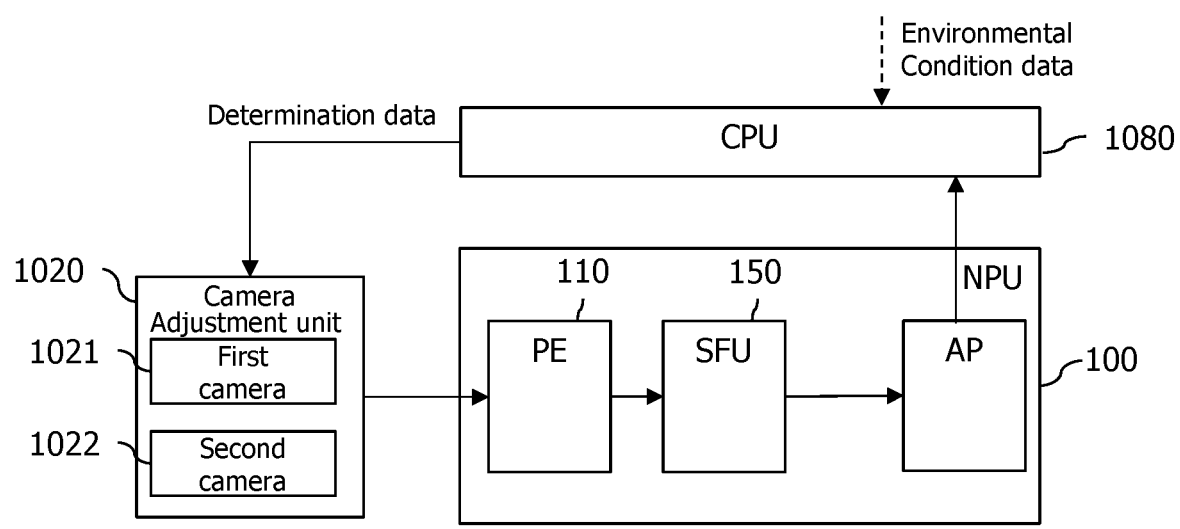

FIGS. 13A to 13C are block diagrams illustrating the configuration shown in FIG. 8 from an operational point of view according to the second disclosure.

As shown in FIG. 13A, a plurality of processing elements 110 and/or SFU 150 in NPU 100 perform operations of artificial neural network models. SFU 150 may be configured to further include circuitry configured to generate determination data. Accordingly, the SFU 150 may be configured to generate a control signal including determination data. The NPU 100 may generate an inference result, that is, a detection or tracking result. The NPU 100 may determine or outputs whether the confidence level of detection or tracking is less than a first threshold value. The SFU 150 may be configured to receive environmental condition data to increase detection or tracking accuracy. If it is determined that the confidence level of detection or tracking is less than the first threshold value, the SFU 150 may be configured to generate control signals (or determination data) including a command for controlling the first camera 1021 or the second camera 1022 based on environmental condition data in order to increase the accuracy of detection or tracking. The NPU 100 may transmit a control signal (or determination data) to the camera adjustment unit 1020. For example, at least some environmental condition data may be obtained through the sensing unit 1030.

Alternatively, as shown in FIG. 13B, a plurality of processing elements 110 and/or SFU 150 in NPU 100 may perform an operation of an artificial neural network model to generate an inference result, that is, a detection or tracking result. The CPU 1080 may receive an inference result from the NPU 100 and determine whether a confidence level of detection or tracking is lower than a first threshold. At this time, the CPU 1080 may process the operation of the SFU 150 instead. In other words, since the SFU 150 may be configured as a dedicated accelerator circuit, it may provide a relatively faster processing speed and lower power consumption than the CPU 1080. The CPU 1080 may be loaded with new functions with various software. On the other hand, since the SFU 150 is a circuit with hard-wired hardware, it may be limited in implementing new functions with software.

If it is determined that the confidence level of detection or tracking is less than the first threshold value, the CPU 1080 may generate a control signal (or determination data) including a command for controlling the first camera 1021 or the second camera 1022 based on environmental condition data in order to increase the accuracy of detection or tracking. The CPU 1080 may transmit a control signal (or determination data) to the camera adjustment unit 1020. For example, at least some environmental condition data may be obtained through the sensing unit 1030.

Alternatively, as shown in FIG. 13C, when the plurality of processing elements 110 and/or the SFU 150 in the NPU 100 perform an operation of an artificial neural network model and output an inference result, that is, a detection or tracking result, the AP may determine whether the confidence level of detection or tracking is less than a first threshold. At this time, the AP may process the operation of the SFU 150 instead. In other words, since the SFU 150 may be configured as a dedicated accelerator circuit, it may provide a relatively faster processing speed and lower power consumption than the AP. The AP can be loaded with new functions with a variety of software. Meanwhile, since the SFU 150 may be a hard-wired circuit, it may be limited in implementing new functions with software.

If it is determined that the confidence level of detection or tracking is lower than the first threshold, the AP may transmit information on inference confidence or a camera control request signal to the CPU 1080. Then, the CPU 1080 may generate a control signal (or determination data) including a command for controlling the first camera 1021 or the second camera 1022 and transmit it to the camera adjustment unit 1020 based on environmental condition data to increase the accuracy of detection or tracking. For example, at least some environmental condition data may be obtained through the sensing unit 1030.

The environmental condition data may include information about a flight altitude or height or flight speed of the movable apparatus 1000 or information about a situation where a confidence level of detection or tracking is less than a first threshold.

Figure 14A:
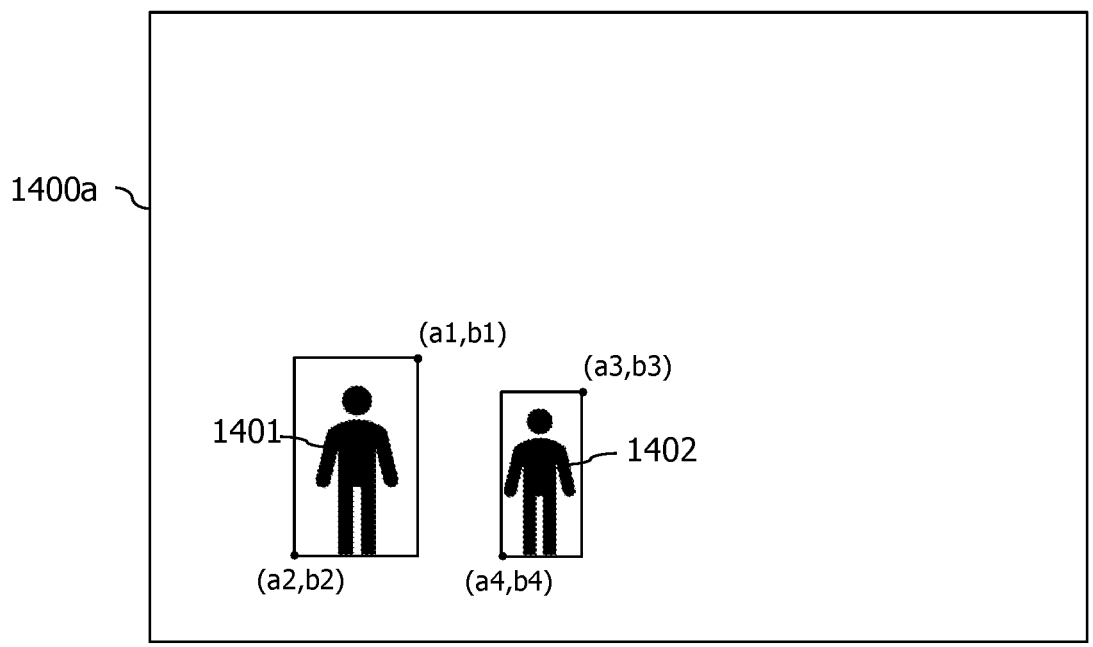
FIGS. 14A and 14B are schematic diagrams illustrating examples of images including a subject.
Figure 14B:
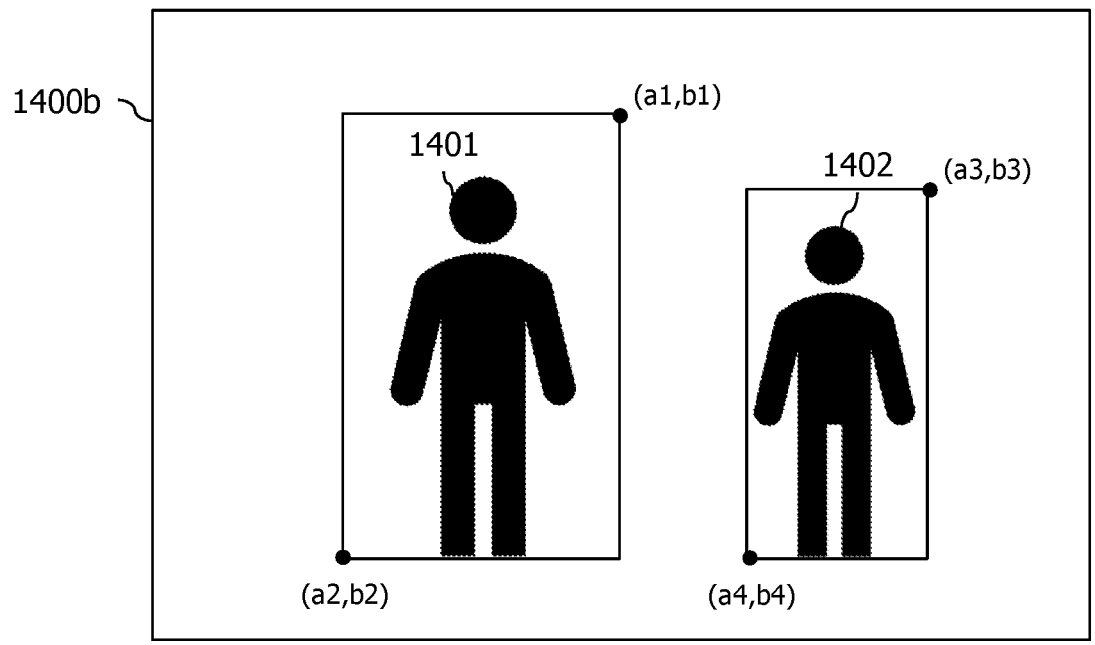

FIGS. 14A and 14B are illustrative diagrams illustrating examples of images including a subject.

As shown in FIG. 14A, the sizes of the first subject 1401 and the second subject 1402 in the image 1400A captured by the first camera 1021 or the second camera 1022 may be relatively too small. Accordingly, a confidence level of a result of detecting or tracking the first subject 1401 and the second subject 1402 in the image 1400a by the NPU 100 may be lower than the first threshold value. In this case, in order to increase the accuracy of detection or tracking, a control signal (or determination data) including a command for controlling the first camera 1021 or the second camera 1022 may be transmitted to the camera adjustment unit 1020.

In this case, the command may include coordinate values of the first subject 1401 and the second subject 1402. In this case, each subject may be represented by two pairs of coordinate values. For example, the first subject 1401 may be expressed as a coordinate value pair (a1, b1) and a coordinate value pair (a2, b2). The second subject 1402 may be expressed as a coordinate value pair (a3, b3) and a coordinate value pair (a4, b4).

In order for the first camera 1021 or the second camera 1022 to capture the first subject 1401 and the second subject 1402 in a larger size based on the command containing the coordinate value, the camera adjustment unit 1020 may control at least one of a first image sensor 1021-2, a first lens driving motor 1021-3, a first ISP 1021-4, a second image sensor 1022-2, a second lens driving motor 1022-3, and the second ISP 1022-4.

Referring to FIG. 14B in comparison with FIG. 14A, it can be understood that the first subject 1401 and the second subject 1402 are captured in a larger size, as the result of the camera adjustment.

For example, in order to relatively increase the size of a subject in a captured image, the resolution of an image output from an image sensor may be increased.

For example, an optical zoom of a lens of a camera may be adjusted in order to relatively increase the size of a subject in a captured image.

Figure 15:
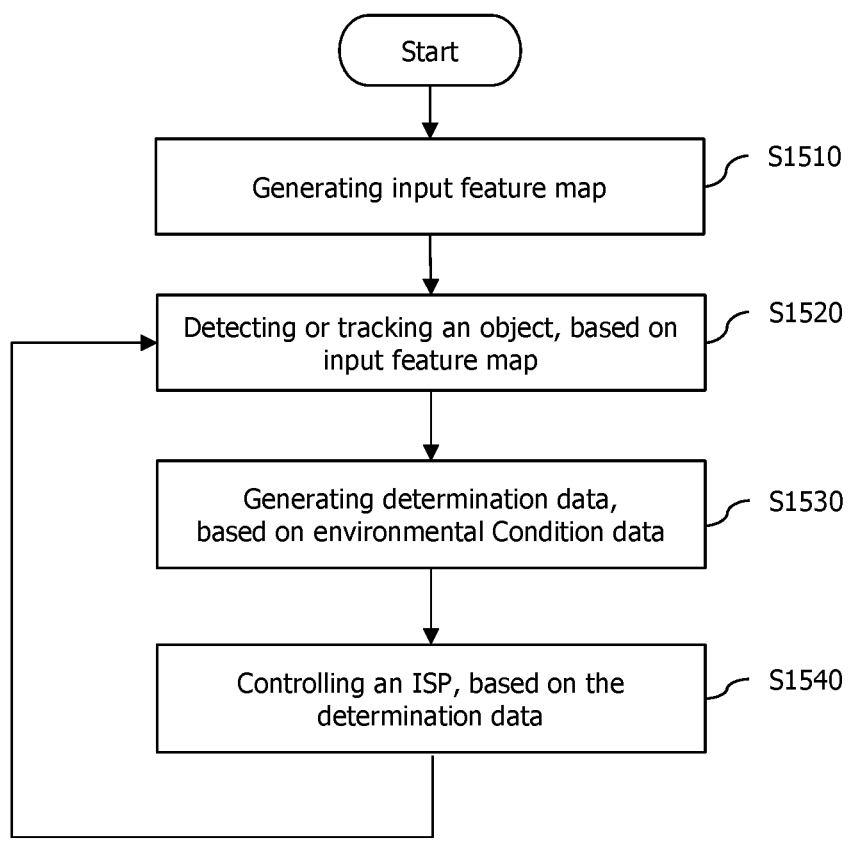
FIG. 15 is a flow chart illustrating an approach according to the second disclosure.

FIG. 15 is a flow chart illustrating an approach according to the second disclosure.

Referring to FIG. 15, an input feature map may be generated S1510.

For example, the frame rate (FPS) and resolution of images output from each image sensor may be adjusted by controlling register values of the first image sensor 1021-2 or the second image sensor 1022-2. For example, the frame rate (FPS) and resolution of images output from each image sensor may be adjusted by controlling register values of the first image sensor 1021-2 or the second image sensor 1022-2.

For example, the first ISP 1021-4 or the second ISP 1022-4 may signal-process and output images acquired from each image sensor. An image can be converted into one or multiple input feature maps.

The input feature map may be an image output from an image sensor or an image processed by an ISP.

Next, an object may be detected or tracked based on the input feature map S1520. Specifically, the NPU 100 may detect or track an object by processing an artificial neural network model operation based on one or more input feature maps generated based on an image.

Then, based on the environmental condition data, determination data (e.g., control signal) may be generated S1530. The environmental condition data may include information about a flight altitude or height or flight speed of the movable apparatus 1000 or information about a situation where a confidence level of detection or tracking is less than a first threshold.

The determination data may include a control signal for controlling at least one of the first image sensor 1021-2, the second image sensor 1022-2, the first ISP 1021-4, and the second ISP 1022-4.

Determination data (e.g., control signals) may be generated by the SFU 150 or AP in the NPU 100 or by the CPU 1080. Determination data (e.g., control signals) may include a command.

More specifically, the determination data (e.g., control signal) may control generation of one or more input feature maps or control at least one attribute of one or more input feature maps.

One or a plurality of input feature maps may be transferred to an arbitrary layer among multiple layers of the artificial neural network model.

The at least one attribute may include the size of at least one input feature map or the resolution of at least one input feature map. The size or resolution may be dynamically adjusted based on environmental condition data, i.e., the altitude of flight of the movable apparatus, the height of the movable apparatus above sea level or ground, or the speed of flight of the movable apparatus.

The determination data (e.g., control signal) may be generated based on the flight altitude of the movable apparatus, the movable apparatus's height above sea level or ground, or the movable apparatus's flight speed.

The determination data (e.g., control signal) may control at least one of the first image sensor 1021-2, the second image sensor 1022-2, the first ISP 1021-4, and the second ISP 1022-4 to generate more of the at least one input feature maps per second S1540.

If at least one attribute is the size of at least one input feature map, and the size of at least one input feature map is reduced based on the generated signal, at least one input feature map may be generated more per second.

Environmental condition data, i.e., the flight altitude of the movable apparatus, the height above sea level or ground of the movable apparatus, or the flight speed of the movable apparatus is increased, a resolution corresponding to at least one attribute may be increased based on determination data (e.g., a control signal).

Environmental condition data, i.e., the flight altitude of the movable apparatus, the sea level or height above the ground of the movable apparatus is increased, the NPU may detect an object in an image captured from an infrared camera or a thermal imaging camera. In this case, the determination data (e.g., control signal) may cause at least one of the first image sensor 1021-2, the second image sensor 1022-2, the first ISP 1021-4, and the second ISP 1022-4 to increase the resolution of an image corresponding to the at least one attribute.

As the flight altitude of the movable apparatus increases, the size of a subject located on the ground captured by the camera decreases in proportion to the altitude. Accordingly, it may be desirable to increase the resolution of an image output by the camera in proportion to the altitude. Also, at this time, as the resolution of the image output by the camera increases, the frame rate per second (FPS) of the image output by the camera may decrease relatively. However, information loss of a captured subject can be minimized according to an increase in image resolution. Meanwhile, even if the subject moves at a specific speed, the relative speed may be captured slowly in an image captured at a high altitude. That is, even if the subject moves at the same speed, the movement distance between pixels between frames of captured images is reduced according to the photographing distance. Therefore, even if the frame rate per second (FPS) of the camera is lowered at high altitudes, capturing at a relatively higher resolution may be more advantageous for object recognition performance.

III. Third Disclosure: Tiling

Tiling is a computer vision approach, in which a large image is broken into many separate, smaller "tiles" and then reassembled. FIG. 16 is a block diagram illustrating the configuration shown in FIG. 8 from an operational point of view according to the third disclosure.

Figure 16:
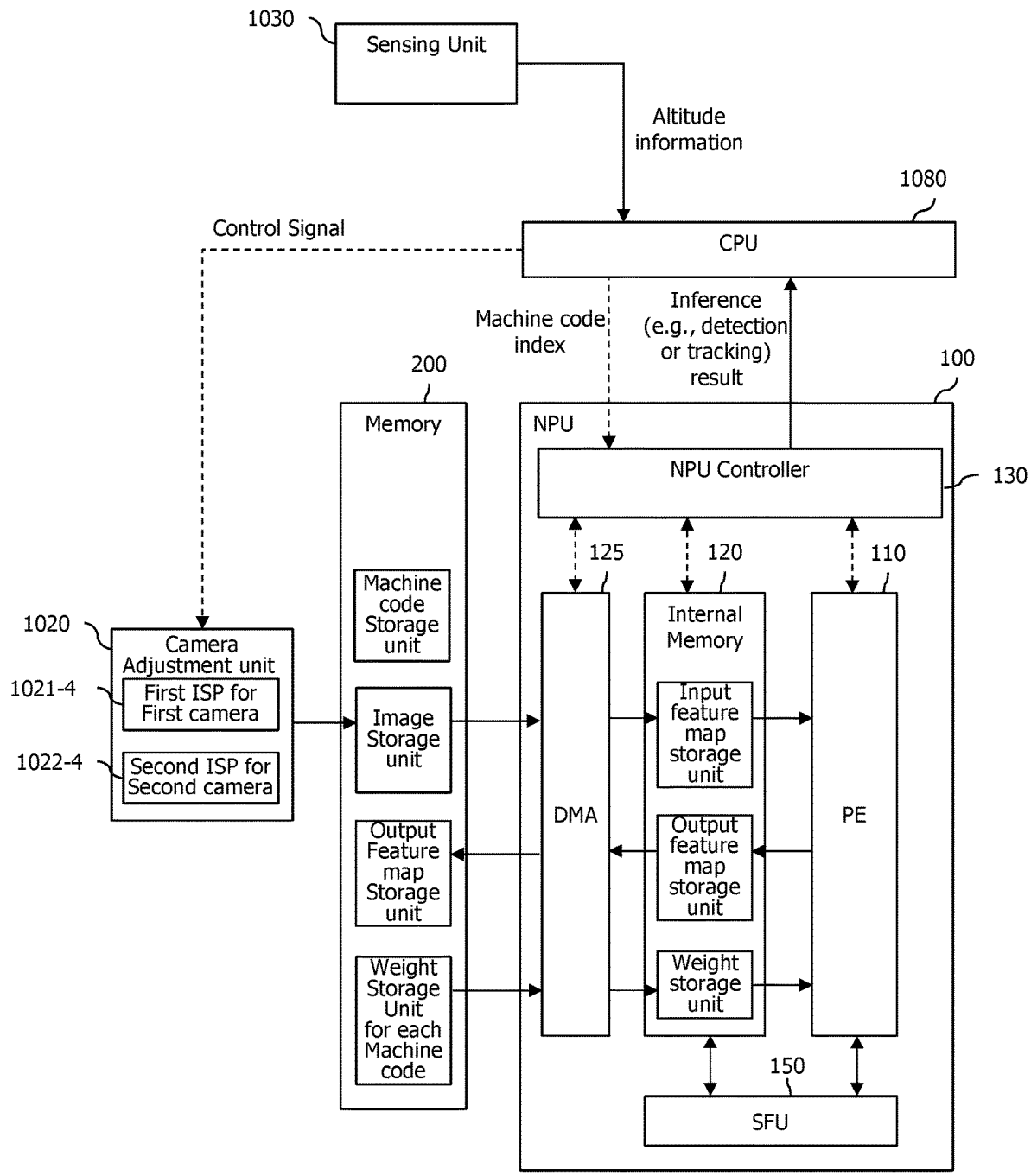
FIG. 16 is a block diagram illustrating the configuration shown in FIG. 8 from an operational point of view according to a third disclosure.

A system bus 1060 as shown in FIG. 8 may be located between the NPU 100, the memory 200, the camera adjustment unit 1020, the sensing unit 1030, and the CPU 1080 shown in FIG. 16. Accordingly, the NPU 100, the memory 200, the camera adjustment unit 1020, the sensing unit 1030, and the CPU 1080 may communicate with each other through the system bus 1060 shown in FIG. 8.

The NPU 100 shown in FIG. 16 may include a plurality of processing elements 110, an SFU 150, an internal memory 120, a DMA 125, and an NPU controller 130 as illustrated in FIG. 8.

The internal memory 120 may include an input feature map storage unit, an output feature map storage unit, and a weight storage unit. Each storage unit should be understood as a concept for distinguishing stored data, and may be controlled by the DMA 125.

The memory 200 shown in FIG. 16 may include a machine code storage unit, an image storage unit, an output feature map storage unit, and a weight storage unit for each machine code.

As described above, a plurality of artificial neural network models may be used. As described above, each artificial neural network model may be converted into machine code by a compiler prepared in advance. For example, the compiler analyzes the size of data corresponding to each layer in an artificial neural network model. The compiler may generate machine code that efficiently uses the internal memory 120 in the NPU 100 and minimizes access to the memory 200 according to the analysis result.

Thus, machine code for each artificial neural network model can be generated. When a plurality of artificial neural network models are provided, machine codes may be generated in a plurality of sets. For example, a set of plurality of machine codes may include a first set of machine code for a first artificial neural network model using an input feature map of a first size (e.g., 200×200×3) and a second set of machine code for a second artificial neural network model using an input feature map of a second size (e.g., 320×320×3). Additionally, the set of plurality of machine codes may further include a third set of machine codes for a third artificial neural network model using an input feature map of a third size.

For example, the machine code storage unit in the memory 200 may store a set of compiled machine codes. In this case, the firmware storage unit in the NPU controller 130 may store only index information for a plurality of machine code sets.

For example, the firmware storage unit of the NPU controller 130 may store a set of compiled machine codes.

For example, the firmware storage unit of the NPU controller 130 may temporarily store only a specific machine code currently being processed in a set of a plurality of machine codes in the memory 200.

At the initializing stage of driving the movable apparatus 1000, the CPU 1080 may load index information for a plurality of machine code sets from a firmware storage unit in the NPU controller 130 and store the index information in a cache memory in the CPU 1080.

The weight storage unit for each machine code in the memory 200 may store weights for machine codes corresponding to each artificial neural network model. The weight storage unit for each machine code in the memory 200 may store weights for machine codes corresponding to each artificial neural network model. For example, the weight storage unit for each machine code in the memory 200 may store a first set of weights for a first set of machine code corresponding to a first artificial neural network model and a second set of weights for a second set of machine code corresponding to a second artificial neural network model. Additionally, the weight storage unit for each machine code in the memory 200 may store a third set of weights for a third set of machine codes corresponding to a third artificial neural network model.

The CPU 1080 may command to store the captured video or a plurality of images in the image storage unit of the memory 200 through the system bus 1060 by controlling at least one of the first image sensor 1021-2, the first ISP 1021-4 of the first camera, the second image sensor 1022-2, and the second ISP 1022-4 of the second camera.

Then, the NPU 100 may retrieve a video or a plurality of images from the image storage unit of the memory 200 and store them in the input feature map storage unit of the internal memory 120 using the DMA 125 under the control of the NPU controller 130.

The CPU 1080 may receive altitude information (e.g., information about sea level or height from the ground) from the sensing unit 1030.

If the flight altitude is increased (i.e., the height of the movable apparatus from the sea level or the ground is increased), since the size of the object in the image becomes smaller, the object may be detected by the NPU 100 with a confidence level lower than the first threshold value, or the detection may fail. Therefore, in order to increase the accuracy of detection or tracking, the CPU 1080 may select a plurality of machine code sets suitable for a corresponding altitude from among a plurality of machine code sets. Next, the CPU 1080 may transfer index information on the selected set of a plurality of machine codes to the NPU 100.

Then, the NPU 100 may command to load a set of a plurality of machine codes selected from the firmware storage unit based on the received index information. Alternatively, the NPU 100 may command to load a set of a plurality of machine codes selected from the machine code storage unit in the memory 200 using the DMA 125 based on the received index information.

In addition, the NPU 100 may command to load weights for a set of a plurality of machine codes selected from the weight storage unit for each machine code in the memory 200 using the DMA 125 based on the received index information.

On the other hand, in order to increase the accuracy of detection or tracking when the flight altitude increases, after generating control signals (e.g., determination data), the CPU may transmit the control signal to at least one of the first image sensor 1021-2 of the first camera, the first ISP 1021-4, the second image sensor 1022-2 of the second camera, and the second ISP 1022-4 of the camera adjustment unit 1020.

The control signal (e.g., determination data) may be used to adjust the resolution of the captured image by the first image sensor 1021-2 of the first camera 1021 or the second image sensor 1022-2 of the second camera.

The control signal (e.g., determination data) may be provided for the first ISP 1021-4 of the first camera 1021 or the second ISP 1022-4 of the second camera to downscale or upscale the captured image.

Specifically, when the flight altitude is low, the control signal (e.g., determination data) may increase the level of downscaling. For example, if the size of the original image is 2048×2048×3 and the flight altitude is lowered, the control signal (e.g., determination data) may be converted into a 320×320×3 image by increasing the level of downscaling. Conversely, when the flight altitude increases, the control signal (e.g., decision data) may lower the level of downscaling, so that the 2048×2048×3 original image may be converted into a 1920×1920×3 image. Alternatively, when the flight altitude is higher, the control signal (e.g., determination data) may command upscaling, and accordingly, the captured original image of 2048×2048×3 size can be converted into an image of 4096×4096×3 size as an example. The converted image may be stored in the image storage unit of the memory 200. Therefore, the size of data to be processed by the NPU 100 can be reduced. Accordingly, power consumption of the movable apparatus 1000 may be reduced and flight time may be increased.

On the other hand, after the NPU 100 retrieves a set of a plurality of selected machine codes from the firmware storage unit, the NPU 100 checks the predetermined number of tilings according to the machine code based on the index information received from the CPU 1080.

Next, the NPU 100 may divide the feature map into blocks according to the number of tilings of the converted image stored in the image storage unit of the memory 200 and store it in the input feature map storage unit in the internal memory 120 of the NPU 100 by using the DMA 125.

For example, if the flight altitude is low and resolution reduction or downscaling is performed to a high degree, the size of the converted image stored in the image storage unit of the memory 200 may be 640×640×3. In this case, the converted image of 640×640×3 size may be tiled with 4 blocks of 320×320×3 size. Thus, the NPU 100 divides the converted image of 640×640×3 size stored in the image storage unit of the memory 200 into 4 blocks (e.g., first block, second block, third block, and fourth block) and stores the first block having a size of 320×320×3 in the input feature map storage unit of the internal memory 120 of the NPU 100 using the DMA 125.

Then, the PEs 110 of the NPU 100 may read the first block from the input feature map storage unit of the internal memory 120, read the weights from the weight storage unit of the internal memory 120, and perform a convolution operation. Next, the PEs 110 of the NPU 100 may read the second block from the input feature map storage unit of the internal memory 120, read the weights from the weight storage unit of the internal memory 120, and perform a convolution operation.

The PEs 110 of the NPU 100 store the output feature map generated by performing the convolution operation in the output feature map storage unit of the internal memory 120.

Figure 17A:
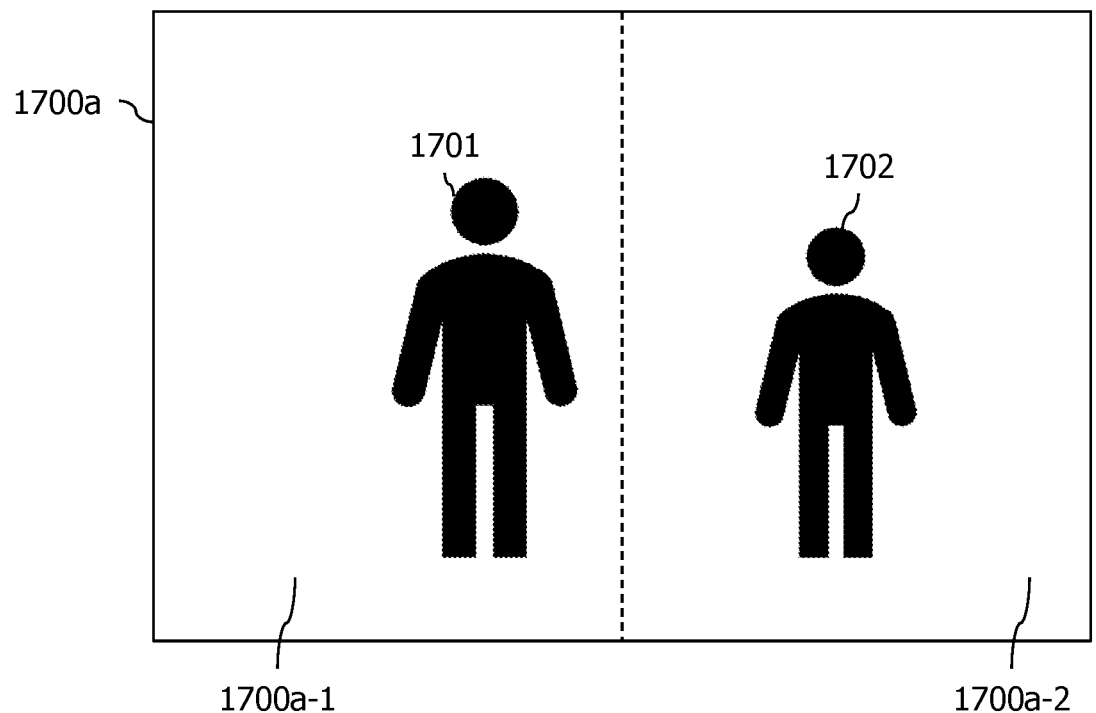
FIGS. 17A and 17B are schematic diagrams illustrating examples of images including a subject.
Figure 17B:
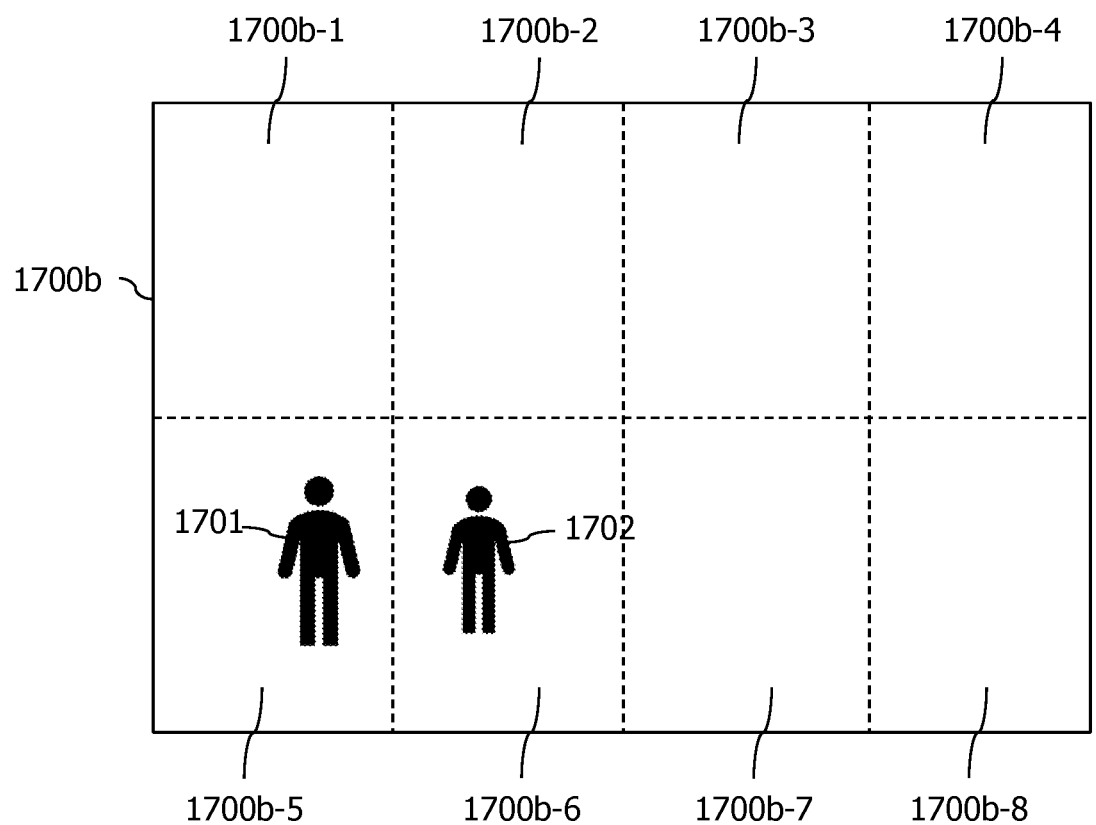

FIGS. 17A and 17B are illustrative diagrams illustrating examples of images including a subject.

An image 1700a shown in FIG. 17A may be, for example, an image captured by the first camera 1021 or the second camera 1022 when the flight altitude of the movable apparatus is low. Since the flight altitude is low, the first subject 1701 and the second subject 1702 may appear relatively large in size in the captured image 1700a.

As such, since the first subject 1701 and the second subject 1702 appear relatively large in size, even if the image size is reduced through resolution reduction or downscaling, the NPU 100 can detect the first subject 1701 and the second subject 1702 well.

Accordingly, the CPU 1080 may generate a control signal (determination data) to at least one of the first image sensor 1021-2 of the first camera, the first ISP 1021-4 of the first camera, the second image sensor 1022-2 of the second camera, and the second ISP 1022-4 of the second camera based on the altitude information obtained from the sensing unit 1030. The generated control signal (determination data) may include a command for increasing a level of resolution or downscaling. For example, when the original image captured by the first camera or the second camera has a first size (e.g., 1920×1920×3), the generated control signal (determination data) may include a command for adjusting or downscaling the resolution to a specific size (e.g., 640×320×3). Next, at least one of the first image sensor 1021-2, the first ISP 1021-4 of the first camera, the second image sensor 1022-2, and the second ISP 1022-4 of the second camera may adjust or downscale the captured original image to a specific size (e.g., 640×320×3 size).

Meanwhile, the CPU 1080 may select an artificial neural network model corresponding to the altitude information acquired from the sensing unit 1030 from among a plurality of artificial neural network models. Then, the CPU 1080 may transfer index information on a set of a plurality of machine codes corresponding to the selected artificial neural network model to the NPU 100.

Then, the NPU 100 may load a set of a plurality of machine codes selected from a firmware storage unit or a machine code storage unit in the memory 200 based on the received index information. In addition, the NPU 100 may load weights for a set of a plurality of machine codes selected from the weight storage unit for each machine code in the memory 200 using the DMA 125 based on the received index information.

For example, the selected artificial neural network model may be an artificial neural network model using an input feature map having a size of 320×320×3. Accordingly, a set of multiple machine codes may be machine codes for an input feature map of size 320×320×3. Also, weights for sets of a plurality of machine codes may also be weights for an input feature map having a size of 320×320×3.

Based on the received index information, the NPU 100 checks the number of tilings predetermined according to machine code.

When the image 1700A shown in FIG. 17A has, for example, a size of 640×320×3, the image 1700A may be tiled into a first block 1700a-1 and a second block 1700a-2 having a size of 320×320×3.

Meanwhile, the image 1700b shown in FIG. 17B may be an image captured by the first camera 1021 or the second camera 1022 when the flight altitude of the movable apparatus is high, for example. Since the flight altitude is high, the first subject 1701 and the second subject 1702 may appear relatively small in size in the captured image 1700B.

As such, since the first subject 1701 and the second subject 1702 appear relatively small in size, a confidence level of a result of detecting or tracking the first subject 1701 and the second subject 1702 in the image 1700b by the NPU 100 may be lower than the first threshold value.

In this case, in order to increase the accuracy of detection or tracking, the CPU 1080 may generate a control signal (determination data) and transmit the control signal to at least one of the first image sensor 1021-2 of the first camera, the first ISP 1021-4 of the first camera, the second image sensor 1022-2 of the second camera, and the second ISP 1022-4 of the second camera, based on the altitude information obtained from the sensing unit 1030. The generated control signal (determination data) may include a command to lower the level of downscaling. For example, when the original image captured by the first camera or the second camera has a specific size (e.g., 1920×1280×3 size), the generated control signal (determination data) may include a command for downscaling to a specific size (e.g., 1600× 800×3 size). Then, at least one of the first image sensor 1021-2 of the first camera, the first ISP 1021-4 of the first camera, the second image sensor 1022-2 of the second camera, and the second ISP 1022-4 of the second camera, may downscale the captured original image (e.g., 1920× 1280×3) to a specific size (e.g., 1600×800×3).

Meanwhile, the CPU 1080 may select an artificial neural network model corresponding to the altitude information acquired from the sensing unit 1030 from among a plurality of artificial neural network models. Then, the CPU 1080 may transfer index information on a set of a plurality of machine codes corresponding to the selected artificial neural network model to the NPU 100.

Then, the NPU 100 may load a set of a plurality of machine codes selected from a firmware storage unit or a machine code storage unit in the memory 200 based on the index information. In addition, the NPU 100 may load weights for a set of a plurality of machine codes selected from the weight storage unit for each machine code in the memory 200 using the DMA 125 based on the received index information.

For example, the selected artificial neural network model may be an artificial neural network model using an input feature map having a size of 400×400×3. Accordingly, a set of plural machine codes may be machine codes for an input feature map having a size of 400×400×3. Also, weights for sets of a plurality of machine codes may also be weights for an input feature map having a size of 400×400×3.

Based on the index information, the NPU 100 may check the number of tilings predetermined according to machine code.

If the image 1700b shown in FIG. 17B has a size of 1600×800×3, for example, the image 1700b may be tiled (divided) into 8 blocks 1700B-1, 1700B-2, 1700B-3, 1700B-4, 1700B-5, 1700B-6, 1700B-7, and 1700B-8 with a size of 400×400×3. If the image 1700b shown in FIG. 17B has a size of 1600×800×3, for example, the image 1700B may be tiled (divided) into 8 blocks with a size of 400×400×3.

On the other hand, the artificial neural network model and weights for each input feature map size are summarized in the table below.

TABLE 1

| Model Name | Input Feature Map Size | Set of Machine Codes | Index of Machine Code Set | Weights |
| --- | --- | --- | --- | --- |
| First Neural Network Model | 200 × 200 × 3 | Set 1 Machine Code | 01 | Set 1 Weight |
| Second Neural Network Model | 320 × 320 × 3 | Set 2 Machine Code | 02 | Set 2 Weight |
| Third Neural Network Model | 400 × 400 × 3 | Set 3 Machine Code | 03 | Set 3 Weight |

Figure 18:
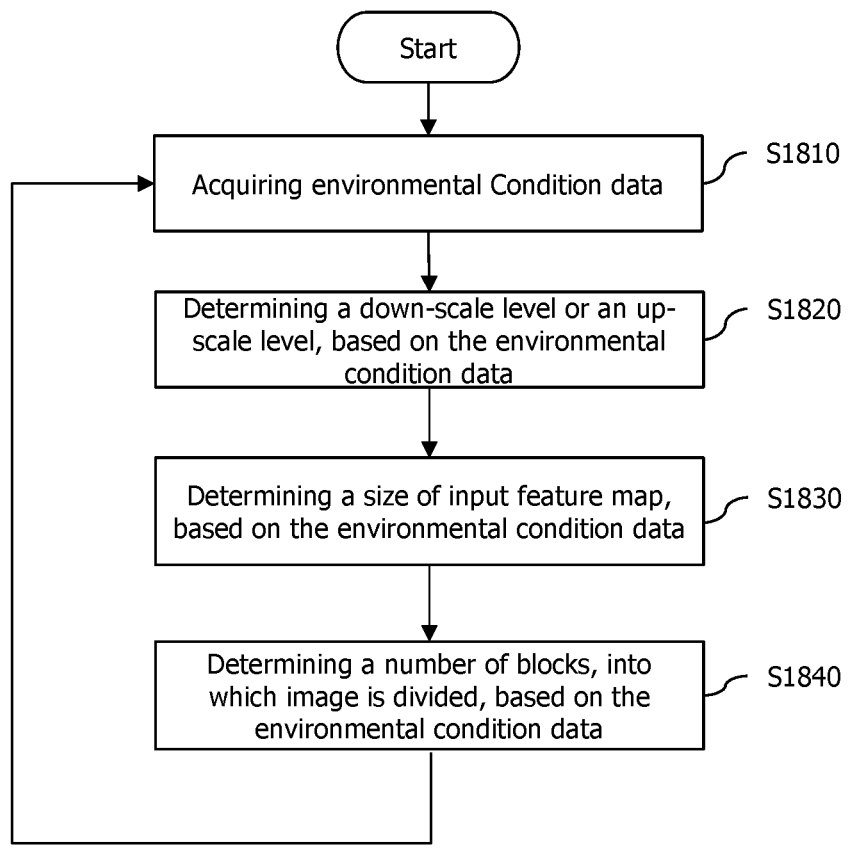
FIG. 18 is a flow chart illustrating an approach according to the third disclosure.

FIG. 18 is a flow chart illustrating an approach according to the third disclosure.

Referring to FIG. 18, environmental condition data (e.g., flight altitude information) may be obtained S1810.

Next, a downscaling level or an upscaling level of the captured image may be determined based on environmental condition data (e.g., flight altitude information) S1820.

Next, the size of the input feature map may be determined based on environmental condition data (e.g., flight altitude information) S1830. Determining the size of the input feature map may mean determining one of a plurality of artificial neural network models.

Next, based on the environmental condition data, a number of blocks in which the image is divided may be determined S1840.

If the number of blocks is greater than the first threshold, multiple image blocks may be upscaled.

Examples of the present disclosure described in the present disclosure and drawings are merely presented as specific examples to easily explain the technical content of the present disclosure and help understanding of the present disclosure, and are not intended to limit the scope of the present disclosure. It is apparent to those of ordinary skill in the art that other modified examples can be implemented or derived, in addition to the examples described.

[National R&D Project Supporting This Invention]
[Task Identification Number] 1711193211
[Task Number] 2022-0-00957-002
[Name of Ministry] Ministry of Science and ICT
[Name of Project Management (Specialized) Institution] Institute of Information & Communications Technology Planning & Evaluation
[Research Project Title] Development of Core Technology for PIM Artificial Intelligence Semiconductor (Design)
[Research Task Title] PIM semiconductor technology development for distributed edge devices to converge a on-chip memory and a calculator
[Contribution Rate]1/1
[Name of Organization Performing the Task] DeepX Co., Ltd.
[Research period] 2023 Jan. 1~2023 Dec. 31

What is claimed is:

1. An apparatus comprising:
   at least one camera;
   a memory configured to store a plurality of machine codes compiled for a plurality of artificial neural network (ANN) models;
   a first semiconductor chip, provided for a neural processing unit (NPU), including:
      a first circuitry provided for an internal memory configured to store an input feature map and an output feature map,
      a second circuitry provided for a direct memory access (DMA) configured to access and control the first circuitry,
      a third circuitry provided for a plurality of processing elements (PEs) configured to process an operation of each ANN model, based on a machine code and the input feature map, and to output the output feature map, and
      a fourth circuitry provided for a controller configured to control the first circuitry, the second circuitry and the third circuitry;
   a second semiconductor chip, provided for a central processing unit (CPU), connected to the memory and the first semiconductor chip and configured to select the machine code in the memory; and
   a signal generator configured to generate a signal applicable to control the at least one camera,
   wherein when at least one object is detected or tracked with a confidence level lower than a corresponding threshold, the signal is generated to include a coordinate of the at least one object.

2. The apparatus of claim 1, wherein the second semiconductor chip is further configured to deliver information on the selected machine code to the first semiconductor chip.

3. The apparatus of claim 1, wherein the first semiconductor chip is configured to acquire the selected machine code from the memory.

4. The apparatus of claim 1,
   wherein the plurality of PEs are configured to receive the input feature map from the internal memory and output the output feature map to the internal memory, and
   wherein the second semiconductor chip is further configured to receive an inference result from the first semiconductor chip.

5. The apparatus of claim 1, further comprising:
   one or more sensors; and
   an image signal processor (ISP).

6. The apparatus of claim 5,
   wherein the ISP generates the input feature map which has an adjustable dimension to be inputted to the first semiconductor chip.

7. The apparatus of claim 5, wherein the one or more sensors are configured to sense a flight altitude or a flight speed.

8. The apparatus of claim 1, wherein the plurality of ANN models include at least one ANN model trained to detect or track at least one object, based on an input feature map generated from at least one image, which is acquired from the at least one camera.

9. The apparatus of claim 1,
   wherein the coordinate is expressed by (a1, b1) and (a2, b2) with respect to two diagonal vertices of a rectangle which contains the at least one object.

10. The apparatus of claim 1,
    wherein a resolution, size or dimension of the input feature map is adjustable based on a determination data, and
    wherein the dimension of the input feature map includes a horizontal size and vertical size of the input feature map and a number of channels.

11. The apparatus of claim 1, further comprising:
    a signal generator configured to generate a signal for the input feature map,
    wherein the generated signal includes at least one command for controlling generation of the input feature map or controlling at least one attribute of the input feature map.

12. The apparatus of claim 11,
    wherein the at least one attribute includes a size of the input feature map or a resolution of the input feature map.

13. The apparatus of claim 12,
    wherein the size or the resolution is adjusted based on a flight altitude or a flight speed.

14. The apparatus of claim 11,
    wherein the at least one command increases a number of the input feature map to be generated per second.

15. The apparatus of claim 11,
    wherein when the at least one attribute is a size of the input feature map, the size of the input feature map is reduced based on the generated signal, and a larger number of the input feature map is generated per second.

16. The apparatus of claim 11,
    wherein when a flight altitude rises or a flight speed increases, the generated signal is used to increase a resolution corresponding to the at least one attribute.

17. The apparatus of claim 1,
    wherein at least one image acquired from the at least one camera is partitioned into a plurality of image blocks based on a determination data, and
    wherein the determination data is set to determine a number of the plurality of image blocks.

18. The apparatus of claim 17,
    wherein when a flight altitude increase, the number of the plurality of image blocks is increased.

19. The apparatus of claim 17,
    wherein when the number of the plurality of image blocks is greater than a first threshold, the plurality of image blocks are upscaled in size before being input to the NPU.

20. The apparatus of claim 1, further comprising:
an image preprocessor configured to divide at least one image acquired from the at least one camera into a plurality of image blocks,
wherein a number of the plurality of image blocks is determined based on a motion of the apparatus.

* * * * *